(12) United States Patent
Sravanapudi et al.

(10) Patent No.: US 7,418,086 B2
(45) Date of Patent: Aug. 26, 2008

(54) MULTIMODAL INFORMATION SERVICES

(75) Inventors: Ajay P. Sravanapudi, Reston, VA (US); Richard D. Day, Ashburn, VA (US)

(73) Assignee: Entrieva, Inc., Reston, VA (US)

( * ) Notice: Subject to any disclaimer, the term of this patent is extended or adjusted under 35 U.S.C. 154(b) by 73 days.

(21) Appl. No.: 11/494,835

(22) Filed: Jul. 28, 2006

(65) Prior Publication Data
US 2007/0005366 A1 Jan. 4, 2007

Related U.S. Application Data

(63) Continuation of application No. 09/800,509, filed on Mar. 8, 2001, now Pat. No. 7,167,830.

(60) Provisional application No. 60/188,320, filed on Mar. 10, 2000.

(51) Int. Cl.
*H04L 12/00* (2006.01)
(52) U.S. Cl. .............. 379/88.13; 704/270; 709/213
(58) Field of Classification Search ............. 709/213; 379/88.13; 704/270
See application file for complete search history.

(56) References Cited

U.S. PATENT DOCUMENTS

| | | | |
|---|---|---|---|
| 5,705,995 A * | 1/1998 | Laflin et al. ............. | 340/7.48 |
| 5,748,186 A * | 5/1998 | Raman ................... | 715/500.1 |
| 5,918,222 A * | 6/1999 | Fukui et al. .............. | 707/1 |
| 6,313,734 B1 * | 11/2001 | Weiss et al. .............. | 340/7.29 |
| 6,591,263 B1 * | 7/2003 | Becker et al. ............. | 707/3 |
| 6,636,587 B1 * | 10/2003 | Nagai et al. ............. | 379/88.14 |
| 6,839,896 B2 * | 1/2005 | Coffman et al. ........... | 719/310 |
| 2004/0034531 A1 * | 2/2004 | Chou et al. .............. | 704/270.1 |
| 2004/0166832 A1 * | 8/2004 | Portman et al. ........... | 455/412.1 |

* cited by examiner

*Primary Examiner*—Daniel D Abebe
(74) *Attorney, Agent, or Firm*—McDermott Will & Emery LLP

(57) ABSTRACT

A system for multimodal information services includes a multimodal information service mechanism for providing the multimodal information services. An information user connects to a first network through at least one communication device, the first network connecting to the multimodal information service mechanism, the information user requesting and receiving the multimodal information services from the multimodal information service mechanism through the device. An information source connects to the multimodal information service mechanism via a second network, the information source providing multimodal information to the multimodal information service mechanism to facilitate the multimodal information services.

29 Claims, 16 Drawing Sheets

MULTIMODAL INFORMATION SERVICES

This application is a continuation of and claims priority to U.S. Ser. No. 09/800,509 filed Mar. 8, 2001, now U.S. Pat. No. 7,167,830 the contents of which are incorporated herein by reference. This application relates to and claims priority from U.S. Patent Application No. 60/188,320, titled "Voice-Enabled Internet Access," filed Mar. 10, 2000, the contents of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to information services, and, more particularly, to services with information in multiple modalities.

BACKGROUND

The Internet has created an entirely new way for people and businesses to interact and share data. However, traditional Internet interaction involves a user at a computer console accessing stored or generated text, image (still and video) and audio data. Typically, data on the Internet are accessed via a so-called Web browser (e.g., AOL's Netscape™ browser). A user connects to the Internet using the browser and provides an address (a URL—uniform resource locator) for the data which the user wishes to access. If the address of the data is valid, the data are provided to the user via the browser. Specifically, images and text represented by the data are displayed by the browser and any sounds represented by the data are reproduced over the user's computer's sound system.

It is desirable, however, to provide a broader range of access mechanisms and approaches to data access on various types of networks. There may be two perspectives in terms of information services. One is the user perspective. For example, it may be desirable for a user to be able to access a typical and general Web site using a telephone (cellular or otherwise) and other devices which have audio capabilities but may have limited or no visual display capabilities. As another example, a user may wish to have requested information delivered simultaneously to both a phone (via voice) and a facsimile machine.

A service provider may also desire a broader range of information delivery mechanisms on various types of networks. For example, an e-business provider may wish to alert its consumers about various upcoming events. Conventionally, such alerts may be sent through a fixed channel (e.g., via electronic mail—e-mail). To be more effective in marketing and sales, the e-business provider may desire to have the capability of automatically reaching its consumers via multiple channels (e.g., via both e-mail and phone).

Some partial and limited solutions do exist for the problem from both the user's perspective and from the information provider's perspective. But there is no coherent solution for both. In addition, each of the current solutions has drawbacks and disadvantages. Present options include the following:

1. Traditional Interactive Voice Response (IVR) system. These systems from telephony vendors such as Lucent and Nortel require significant knowledge of telephony. Developers must understand telephony concepts such as inbound and outbound calls, call control capabilities, automatic call distribution (ACD) hardware, public service telephone network (PSTN) protocols, and the intricacies of the private branch exchange (PBX) used at that site. All these technologies are considered part of the "traditional" telecommunication industry and have a steep learning curve. This learning curve is maintained by the profusion of vendor-specific hardware and software that sustains a special vocabulary that is unique to the telecommunications industry. Although IVR solutions provide hooks to mainframe databases and traditional relational databases, the telephony orientation of the development tools makes it very difficult for a typical web developer to create voice solutions. Further, incorporating speech recognition into these solutions provides an additional challenge. Current host-based speech recognition engines require developers to understand many concepts that are unique to speech recognition applications. These include concepts such as grammars, n-best processing, Hidden Markov Chains, end-pointing, and special languages to build and compile grammars to be used in these applications.

2. Embedded special tags to enable parts of a website. There are some companies (such as Vocalis) that provide this capability. Special tags inserted into a web page enable their speech recognition engines to recognize the tagged key words. These solutions require users to change their sites, re-test, and re-deploy them, resulting in significant costs.

3. Verizon offers alert services through wireless phone service to its customers. A customer specifies categories of interest (e.g., stock price) to be alerted about and the conditions under which the alerts are sent. When an alert is sent, it is sent to the customer's wireless phone in the form of text displayed on the screen of the phone. In this case, an alert is sent via a fix channel, i.e., wireless network, in a fixed modality, i.e., text modality.

All existing approaches require significant amounts of special hardware 5 with very special hosting needs.

BRIEF DESCRIPTION OF DRAWINGS

Objects, features, and advantages of the present invention are described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE EXEMPLARY EMBODIMENTS

Figure 1:
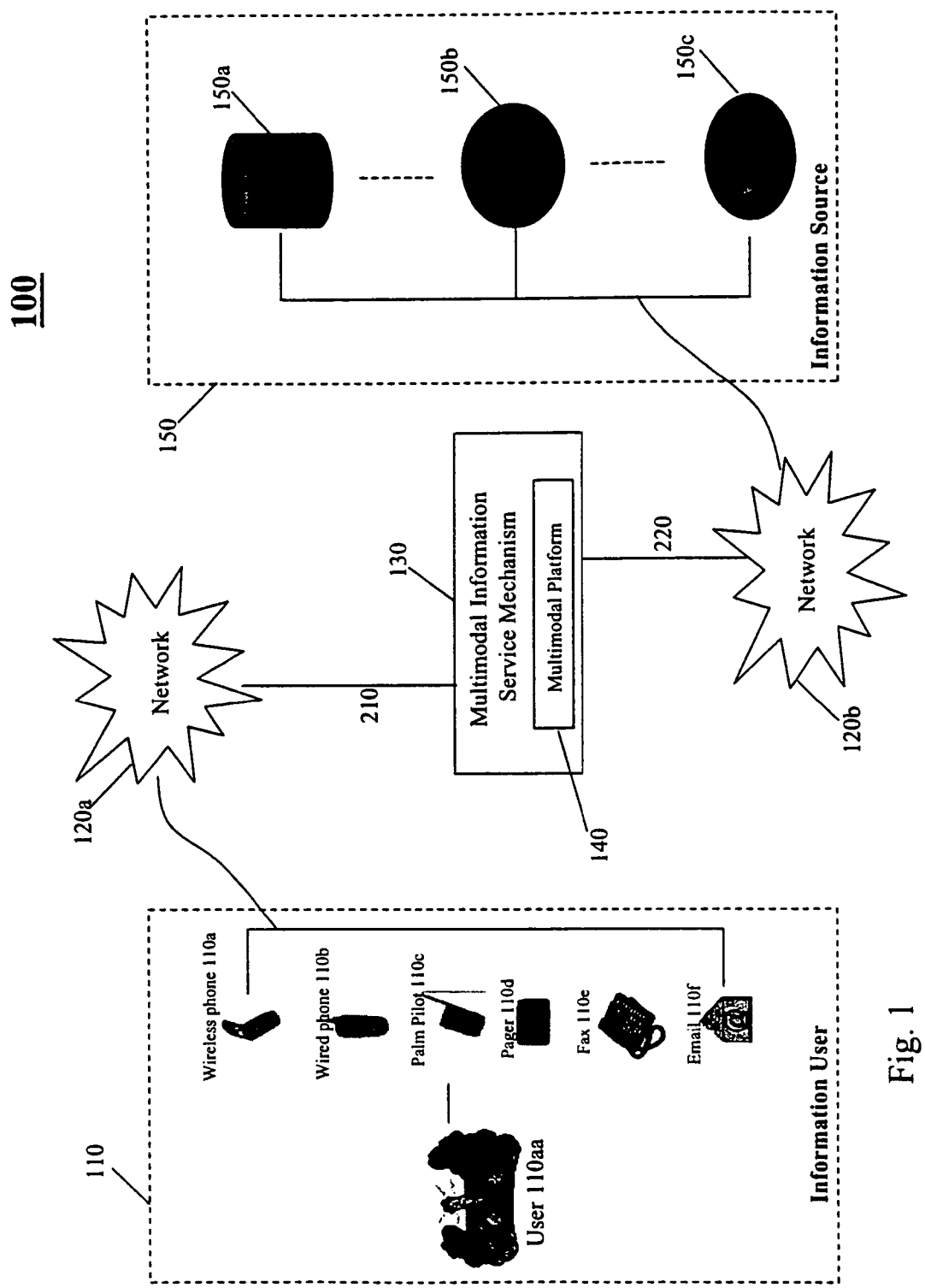
FIG. 1 depicts the high-level architecture of embodiments of the present invention.

A high-level architecture of embodiments of the present invention and of the environment in which the present invention operates is shown in FIG. 1. The system 100 shown in FIG. 1 includes an information user 110, a first network 120a, a multimodal information service mechanism 130, a second network 120b, and an information source 150. In system 100, the information user 110 sends a request, via network 120a, to the multimodal information service mechanism 130 to request a service. Such a service may include accessing information in different modalities through the multimodal information service mechanism 130. Based on the request, the multimodal information service mechanism 130 obtains requested information from the information source 150 via a multimodal platform 140, that may convert the information from the information source 150 into an appropriate modality that is suitable to the information user 110.

In FIG. 1, the information user 110 includes a user 110aa, who issues a service request via a communication device. Such communication device may include, for example, a wireless phone 110a (which may be a Wireless Application Protocol (WAP) enabled phone), a wired phone 110b, a Personal Digital Assistant (PDA) such as a Palm Pilot™ 110c, a pager 110d, a facsimile device 110e, or an electronic mail server 110f. Through these communication devices, the user 110aa may request and receive a service. The service may be both requested and delivered in different modalities. For example, the user 110aa may issue a service request either over a wireless phone via speech or on a Palm Pilot™, via text command (e.g., a URL address). The user 110aa may also receive delivered service in different modalities. For example, the web text information, requested by the user 110aa, may be sent to the user 110aa simultaneously in text form through an e-mail or in voice form through a phone.

The information source 150 in FIG. 1 is where the information, serviced by the multimodal information service mechanism 130, is initially obtained during the service. An information source may be, for example, a database 150a that may host structured information, a web site 150c which may host semi-structured information, or an application 150b which may generate unstructured data. Different information sources may host data in different modalities. For example, a web site may host text information and an application may produce speech data. A single information source may also simultaneously host data in different modalities. For example, a database may host both text and speech data.

Information from the information source 150 may be retrieved in its respective source modality. Information delivered to the information user 110 may be in its respective destination modality. The source modality may be different from the destination modality. For example, the user 110aa may request the text content hosted on a web site to be delivered in speech form. In this case, the retrieved text content may be transformed into speech via a Text-To-Speech engine so that the text content maybe read to the user 110aa over a phone.

In FIG. 1, network 120a and network 120b represent generic networks. For example, they may include the Internet, a Public Service Telephone Network (PSTN), or a wireless network. Depending on the data to be transferred on each connection, appropriate network 120a and 120b may be used.

The multimodal information service mechanism 130 may provide various information services to the information user 110. Such services may involve information in different modalities and the multimodal platform 140 facilitate various needs in handling multimodal data in such services. For example, the multimodal platform 140 may provide the means to convert data from one modality to another. Based on the multimodal platform 140, various applications may be built to offer corresponding services. Such applications, together with the multimodal platform 140 form the multimodal information service mechanism 130 according to embodiments of the present invention, e.g., as is shown in FIG. 2.

Figure 2:
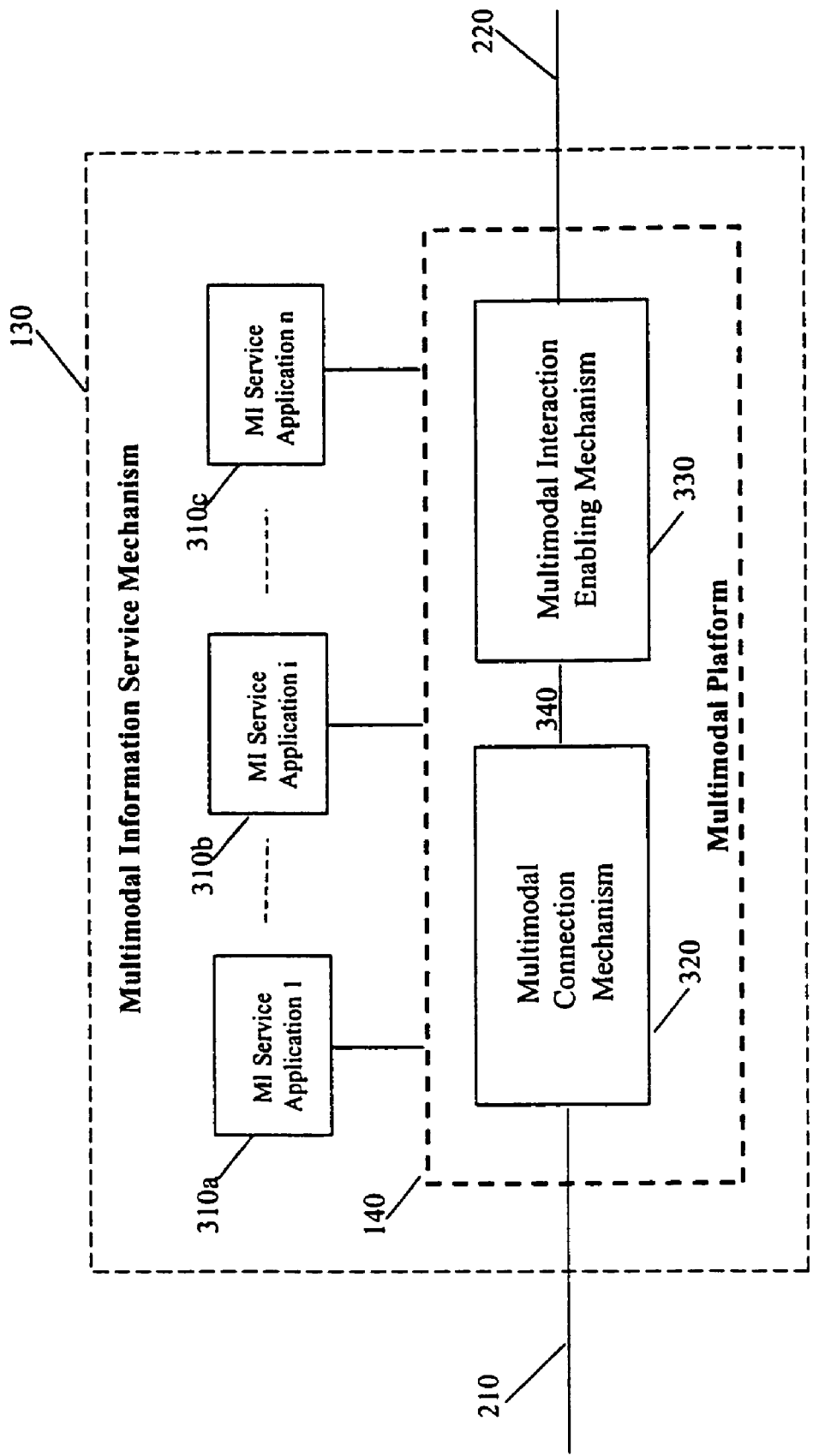
FIG. 2 depicts the high-level architecture of a multimodal information service mechanism according to of embodiments of the present invention.

In FIG. 2, the multimodal information service mechanism 130 includes a multimodal platform 140 and a set of Multimodal Information (MI) Service Applications 310a, . . . , 310b, . . . , 310c, that are each built based on the multimodal platform 140. The multimodal platform 140 includes a multimodal connection mechanism 320 and a multimodal interaction enabling mechanism 330. The multimodal connection mechanism 320 establishes appropriate channels for the information to be delivered to the information user 110 according to the destination modality as well as the communication device that the information user 110 is using to receive the service.

The multimodal interaction enabling mechanism 330 may perform various functions to enable the interaction between the information user 110 and the information source 150. For example, data retrieved in a source modality may need to be converted into its destination modality. Since both source modality and destination modality may be one of a plurality of modalities, the multimodal interaction enabling mechanism 330 may provide the data conversion from a plurality of source modalities to a plurality of destination modalities.

Figure 3:
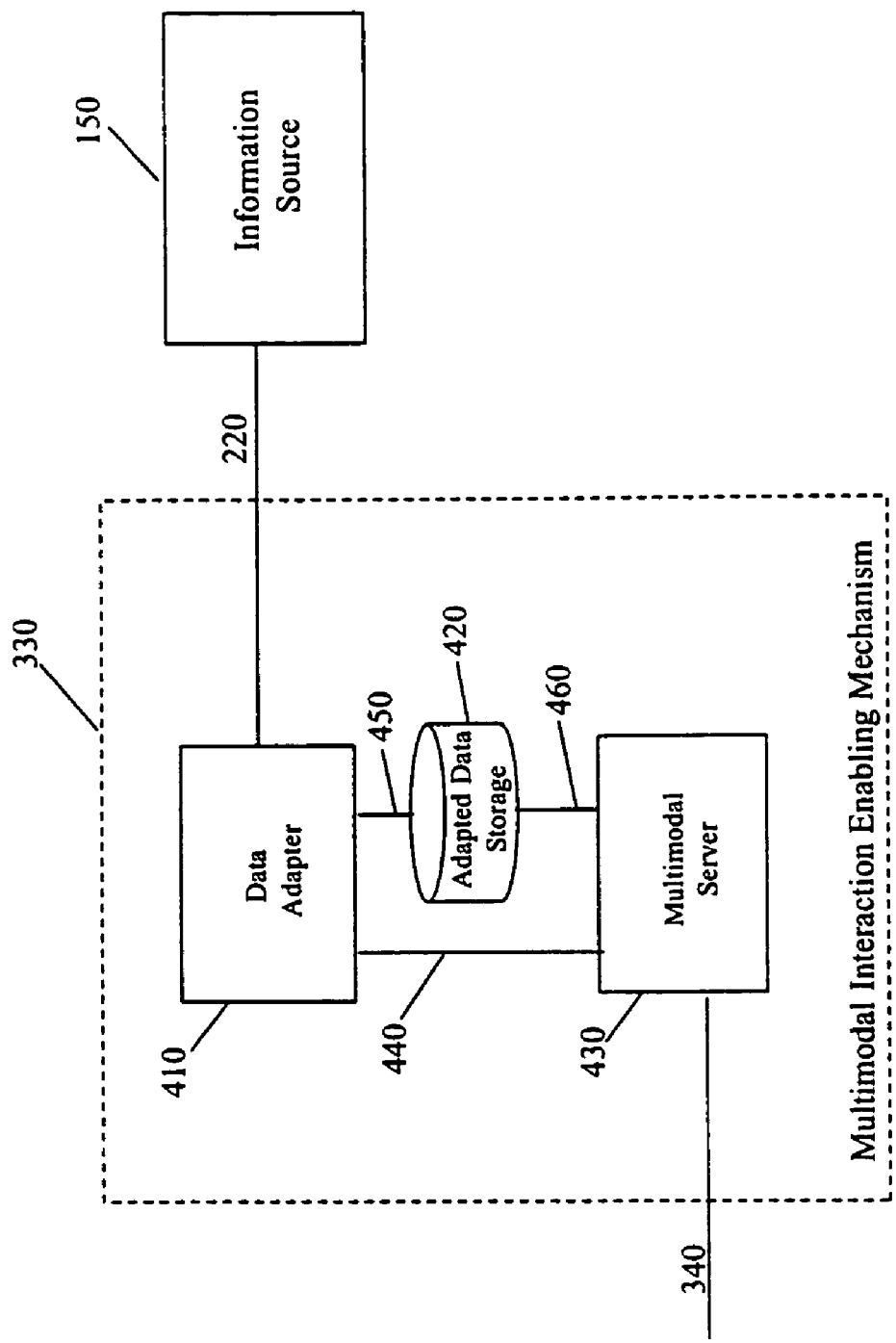
FIG. 3 depicts the structure of a multimodal interaction enabling mechanism, in relation to an information source, according to of embodiments of the present invention.

FIG. 3 depicts the internal structure of the multimodal interaction enabling mechanism 330 according to embodiments of the present invention. The multimodal interaction enabling mechanism 330 depicted in FIG. 3 performs modality conversions through a data adapter 410 which may retrieve the data in source modality from the information source 150, generate the data in destination modality, and store the adapted data (the data in destination modality) in an adapted data storage 420.

The modality conversion performed by the data adapter 410 may be facilitated by a multimodal server 430. For example, if the data adapter 410 is converting speech data (e.g., the source modality is audio modality) into an electronic mail (e.g., the destination modality is text modality), the data adapter 410 may first rely on an Automatic Speech Recognizer (ASR) in the multimodal server 430 to generate transcribed text from the given speech data. To further compose an electronic mail from the transcribed text, the data adapter 410 may utilize a mail server in the multimodal server 430 to construct an electronic mail.

The adapted data (in destination modality) may be stored for future use. In this case, the adapted data storage 420 may also serve as one of the information sources (not shown in FIG. 3). For example, the transcribed text (from given speech data) in the above example may be stored in the adapted data storage 420. When the same service is requested, the transcribed text may be retrieved directly from the adapted data storage 420 instead of retrieving the speech data from the original information source and then converting the speech data to text again.

The adapted data retrieved from the adapted data storage 420 may also be used as the data in an intermediate modality to facilitate the conversion from a source modality to a destination modality. For example, this could be the case if the information user 110 requested a service based on the same speech data but indicated that the service being delivered to the information user 110 via facsimile. In this scenario, the transcribed text may be retrieved directly from the adapted data storage 420 and then may be further used to construct a facsimile file (destination modality). To convert the transcribed text into a facsimile, the retrieved transcribed text may be sent to a facsimile server in the multimodal server 430 to produce a facsimile.

Figure 4:
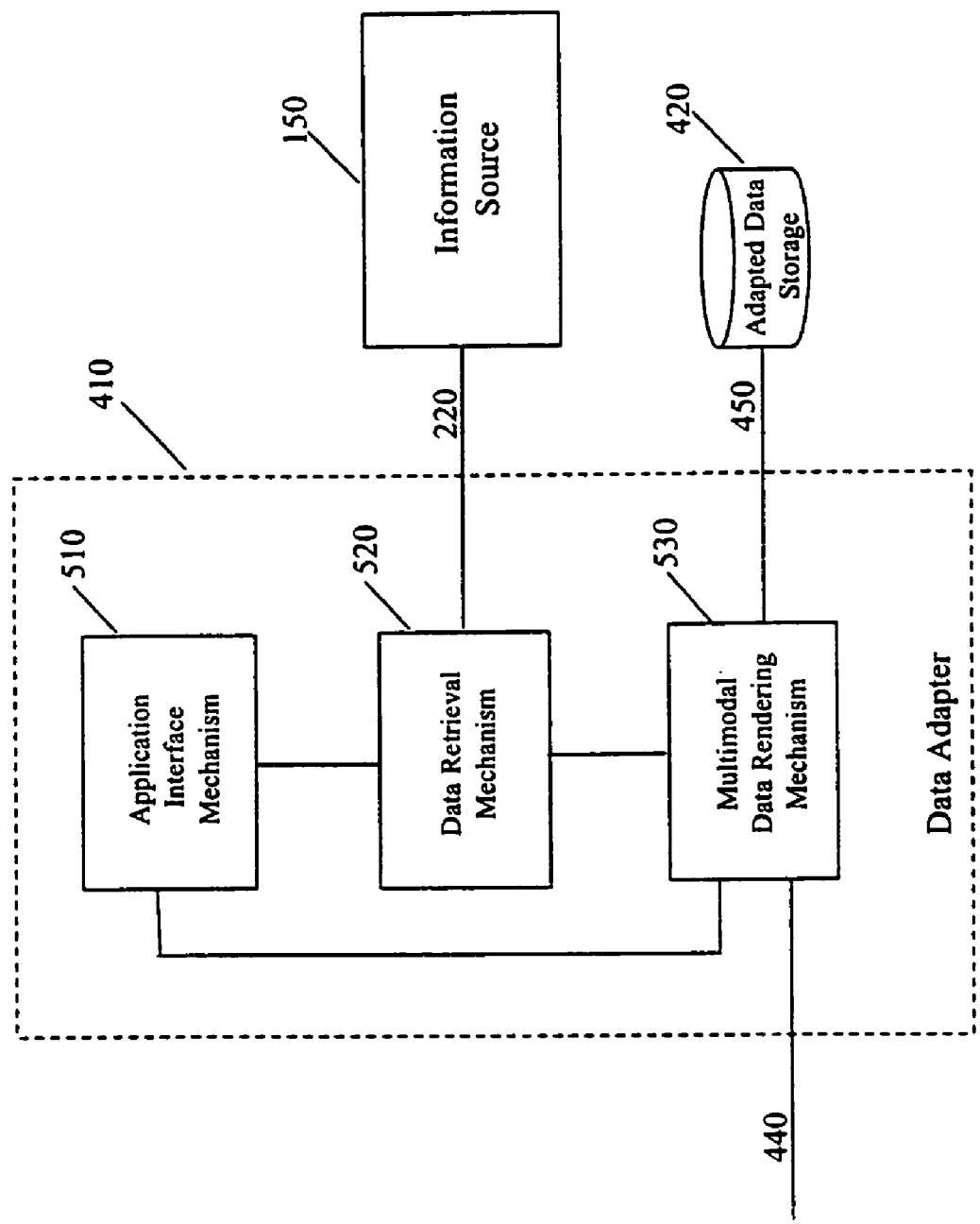
FIG. 4 depicts, in part, the structure of a data adapter according to of embodiments of the present invention.

FIG. 4 illustrates the internal structure of the data adapter 410 according to embodiments of the present invention. In FIG. 4, the data adapter 410 includes an application interface mechanism 510, a data retrieval mechanism 520, and a multimodal data rendering mechanism 530. The application interface mechanism 510 interacts with the MI service applications (310*a*, . . . , 310*b*, . . . , 310*c*) and may identify the information required to perform data conversion. For example, such information may include the location of the information source (e.g., Uniform Resource Locator or URL address of a web page), the source modality (e.g., text), or the requested destination modality (e.g., speech).

Figure 5:
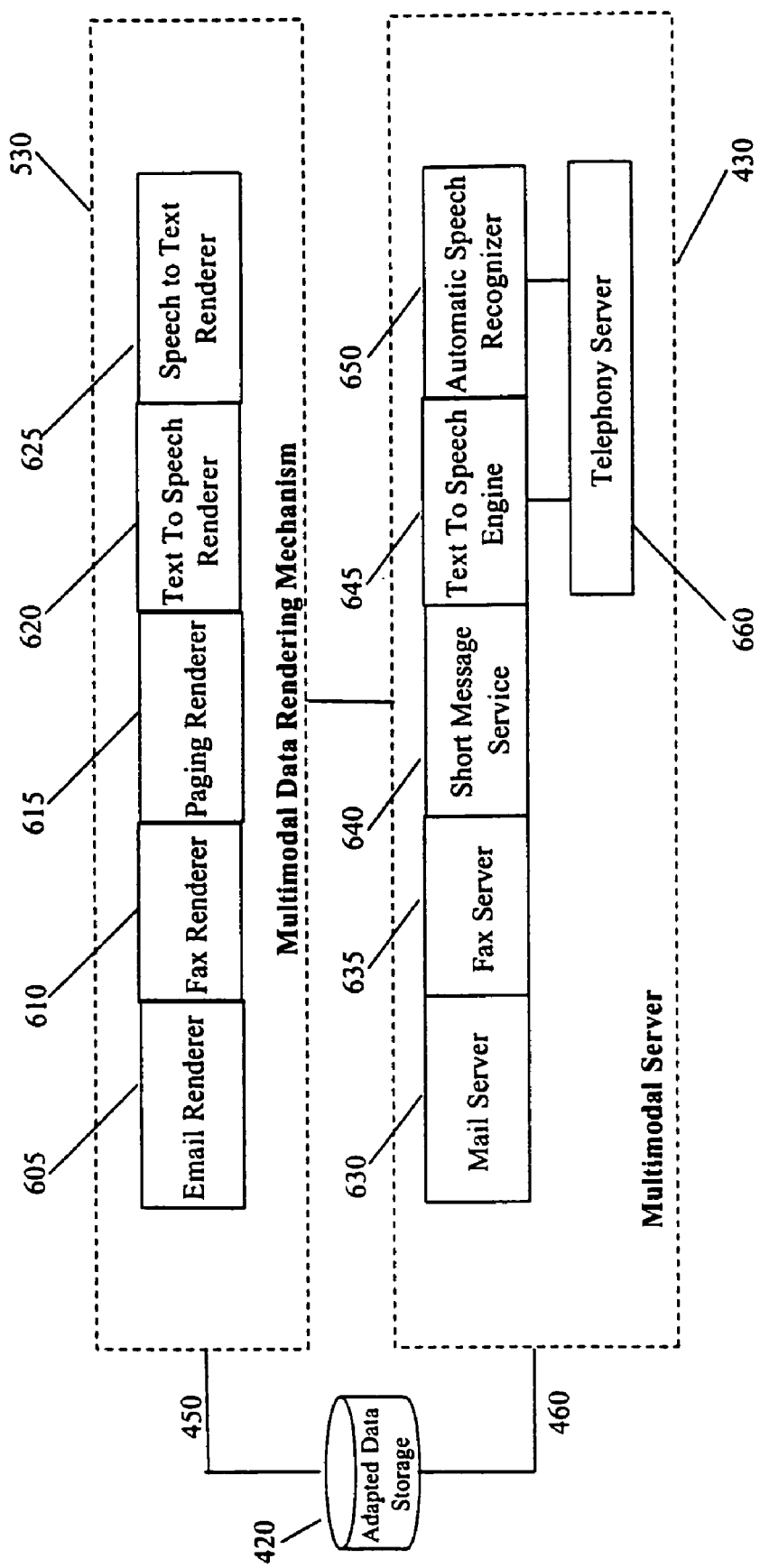
FIG. 5 describes the internal structures of a multimodal data rendering mechanism and a multimodal server as well as how they are connected according to of embodiments of the present invention.

The data retrieval mechanism 520 in FIG. 5 retrieves data from the information source in source modality. The information necessary to facilitate the data retrieval mechanism 520 (e.g., the URL address of a web page) may be supplied by the application interface mechanism 510. The data retrieval mechanism 520 may be capable of handling data in a plurality of modalities. The retrieved data in its source modality may then be passed on from the data retrieval mechanism 520 to the multimodal data rendering mechanism 530.

The multimodal data rendering mechanism 530 performs data conversions from one modality to another. In other words, it renders data in one modality into the data in another modality. The multimodal data rendering mechanism 530 may take input from both the application interface mechanism 510 and the data retrieval mechanism 520. The former may provide the information necessary to perform the data conversion (e.g., the destination modality) and the latter may supply the data retrieved from the information source 150 in a source modality.

The application interface mechanism 510 acts as an interface between an MI service application and the multimodal data rendering mechanism 530. For example, an MI service application may correspond to an e-business alert service that sends alerts, based on some events, via some pre-specified means. In this case, the MI service application 310*a* may send the content of an alert directly to the application interface mechanism 510. The MI service application 310*a* may also supply (to the application interface mechanism 510) the information related to how the alert should be sent out. Such information may include to whom the alert should be sent, the modality used to send the alert (e.g., speech), and the means through which the alert is to be sent (e.g., wireless phone).

The multimodal data rendering mechanism 530 may also receive the source data directly from the adapted data storage 420. Using the above example of the e-business alert service, if an alert constructed in its destination modality needs to be sent again next day, the alert in its destination modality may be stored in the adapted data storage and retrieved next day.

FIG. 5 shows an exemplary internal structure of the multimodal data rendering mechanism 530, an exemplary internal structure of the multimodal server 430, and the relationship between the two, according to embodiments of the present invention. The exemplary multimodal data rendering mechanism 530 shown in FIG. 5 includes various renderers such as an e-mail renderer 605, a facsimile renderer 610, a paging renderer 615, a text-to-speech renderer 620, and a speech-to-text renderer 625. Each of the renderers shown in FIG. 5 may be responsible for rendering some data into a fixed modality. For example, the email renderer 605 may take text data and render it into an electronic mail.

As indicated herein, the multimodal server 430 may facilitate the multimodal data rendering mechanism 530 to perform modality conversions. In FIG. 5, the exemplary multimodal server 430 includes a mail server 630, a facsimile server 635, a short message server 640, a text-to-speech engine 645, an automatic speech recognizer 650, and a telephony sewer 660. Each server in the multimodal server 430 may deal with data in a single modality and may correspond to an associated renderer in the multimodal data rendering mechanism 530 that converts source data to the same modality. For example, the mail server 630 may correspond to the e-mail renderer 605, and the short message server 640 may correspond to the paging renderer 615, etc. The telephony server 660 may facilitate the data in speech modality.

Once the source data (i.e., data in its source modality) is converted into its destination modality, it may be sent to the information user 110 who requested the data in the destination modality. The data in its destination modality may have to be delivered through appropriate channels. The choice of destination modality and channel may depend on the communication device to which the information user 110 may have instructed the data to be sent. For example, the information user 110 may specify to send a web page content to a wireless phone (i.e., the communication device). In this case, the web page content (text) may be first converted into speech data (via, e.g., a text-to-speech engine). Such speech data may have to be channeled through a wireless network to be delivered to the specified wireless phone.

Figure 6:
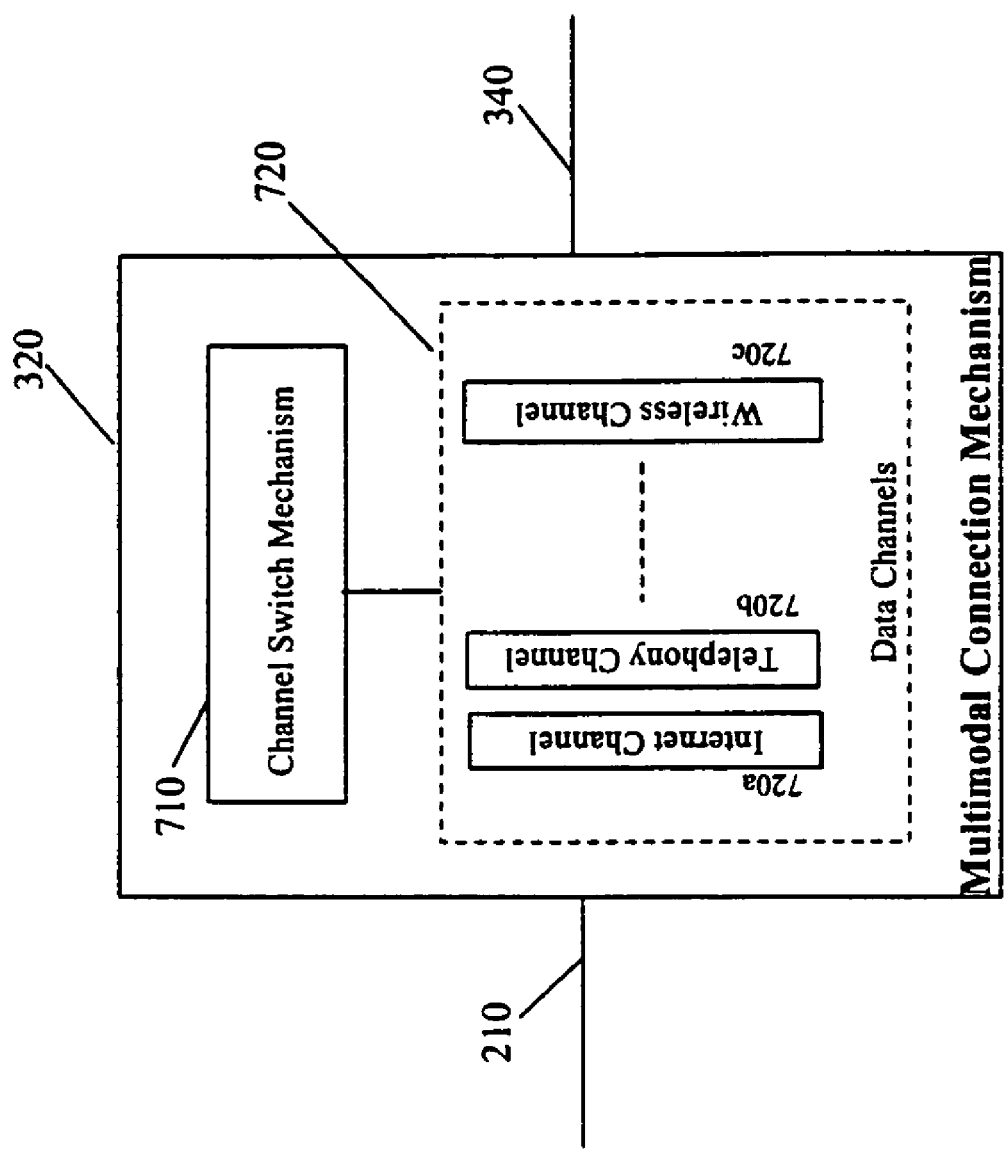
FIG. 6 shows the structure of a multimodal connection mechanism according to of embodiments of the present invention.

In system 100, routing data into an appropriate delivery channel is performed by the multimodal connection mechanism 320 (e.g., as shown in FIG. 2). An exemplary structure of the multimodal connection mechanism 320 is illustrated in FIG. 6, in which the multimodal connection mechanism 320 includes a channel switching mechanism 710 and a plurality of data channels 720. The channel switching mechanism 710 routes data in certain modality to proper channels. Examples of such channels include an Internet channel 720a, a telephony channel 720b, a wireless channel 720c, and the like.

Figure 7:
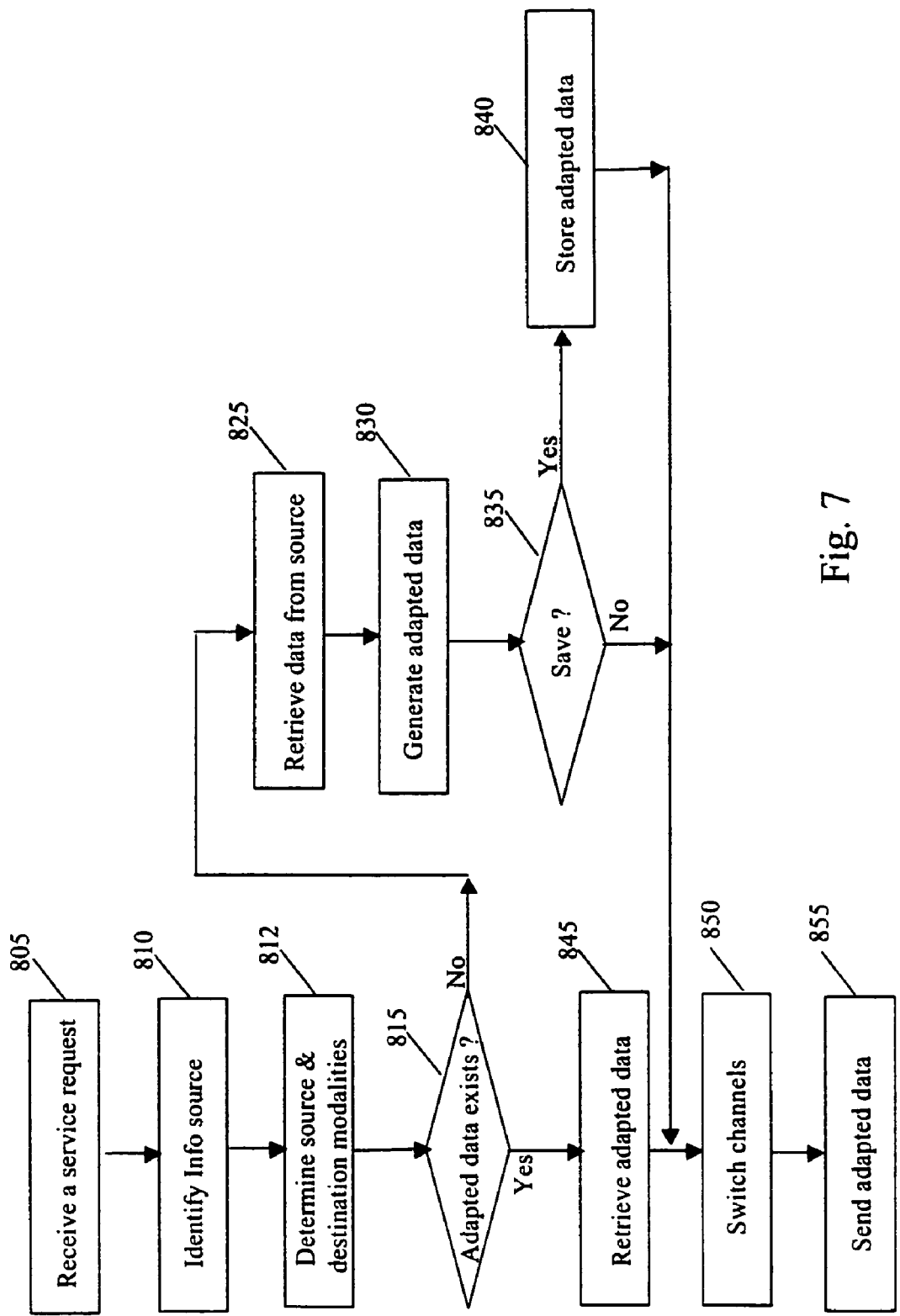
FIG. 7 is an exemplary flowchart for multimodal information services according to of embodiments of the present invention.

FIG. 7 is an exemplary flowchart of a process that provides multimodal information services according to embodiments of this invention. A service request is first received, at act 805, from the information user 110. The information source 150 is determined, at act 810, based on the received request. Furthermore, both source and destination modalities may be determined at act 812 based on the request. For example, if the information user 110 request a web page with a URL address, the source modality may be inferred as text. The information user 110 may also specify, in the request, the destination modality. For example, an e-mail address may be provided as where the requested information is to be sent. In this case, the destination modality is text in e-mail form.

The destination modality may also be identified automatically according to the type of communication device that the information user 110 is using. For example, if the information user 110 is requesting some content from a web page via a wired phone, it may be assumed, as default, that the requested content should be sent to the same phone that the information user 110 is using to issue the request.

Based on the information source identified from the request, it is examined, at act 815, to see whether the requested data, in the required destination modality, already exists in the adapted data storage 420. If the adapted data (data in its destination modality) already exists, it is retrieved, at act 845, from the adapted data storage 420. Otherwise, the requested data in its source modality is retrieved, at act 825, from the information source 150.

The retrieved data in source modality is then converted, at act 830, into its destination modality. Such adapted data may be stored for future use. At act 835, whether the adapted data is to be stored is determined. The adapted data is then stored, at act 840, into the adapted data storage 420 if it is to be stored.

The obtained adapted data corresponds to the requested information in its destination modality. Such adapted data is switched, at act 850, into an appropriate channel, through which the requested information is sent, at act 855, to the information user 110.

Figure 8:
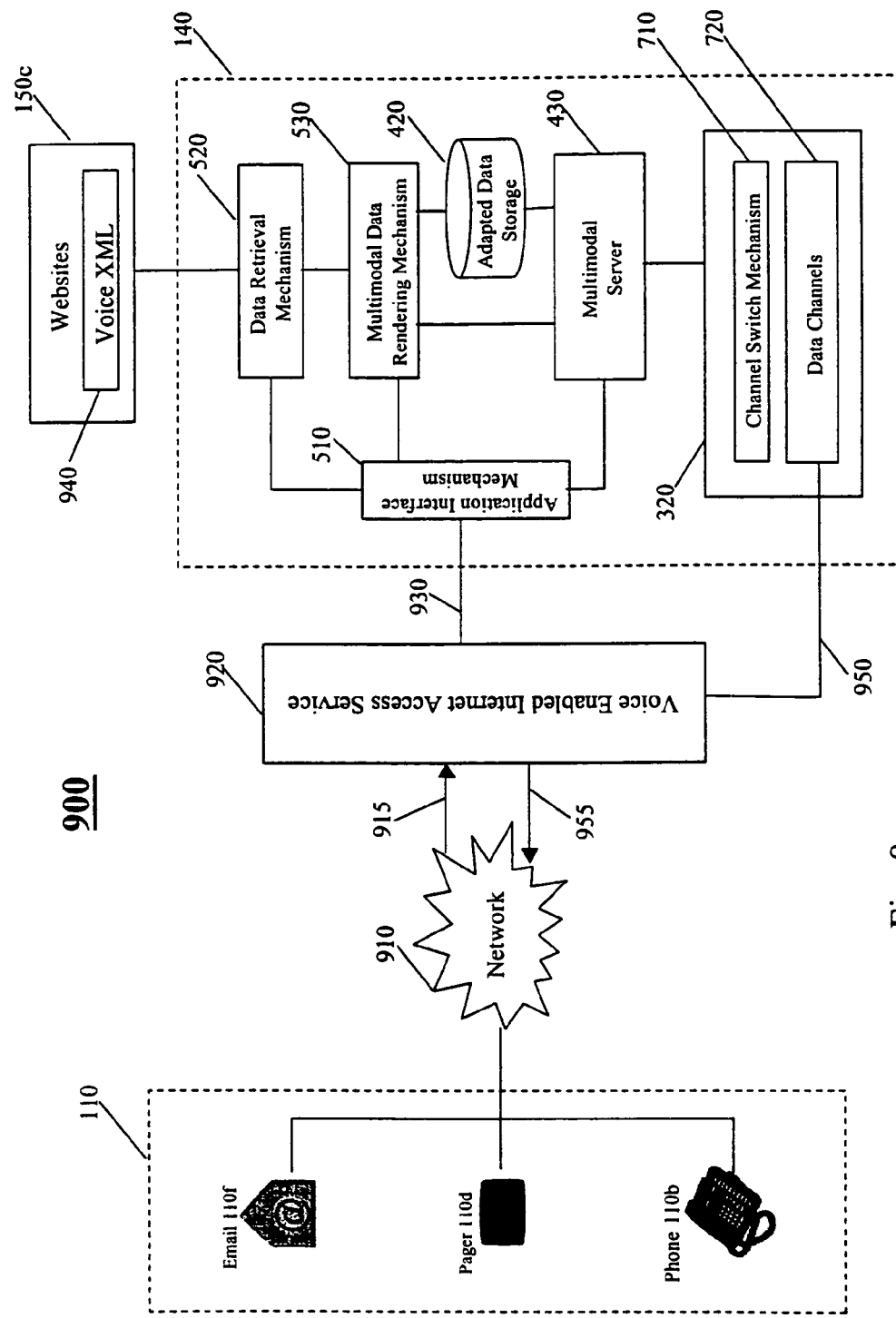
FIG. 8 depicts the high-level architecture of a voice-enabled Internet access service built on top of a multimodal platform according to of embodiments of the present invention.

As illustrated in FIG. 2, different MI service applications (310a, . . . , 310b, . . . , 310c) can be built based on the multimodal platform 140. Different MI service applications may provide different services. For example, MI service application 310a may provide a voice-enabled Internet access service and MI service application 310b may provide an e-business alert service. In referring to FIGS. 8 and 16, two MI service applications corresponding to the above mentioned services are described. Particularly, the manner in which these two applications may be built and operated based on the multimodal platform 140 is illustrated.

Figure 9:
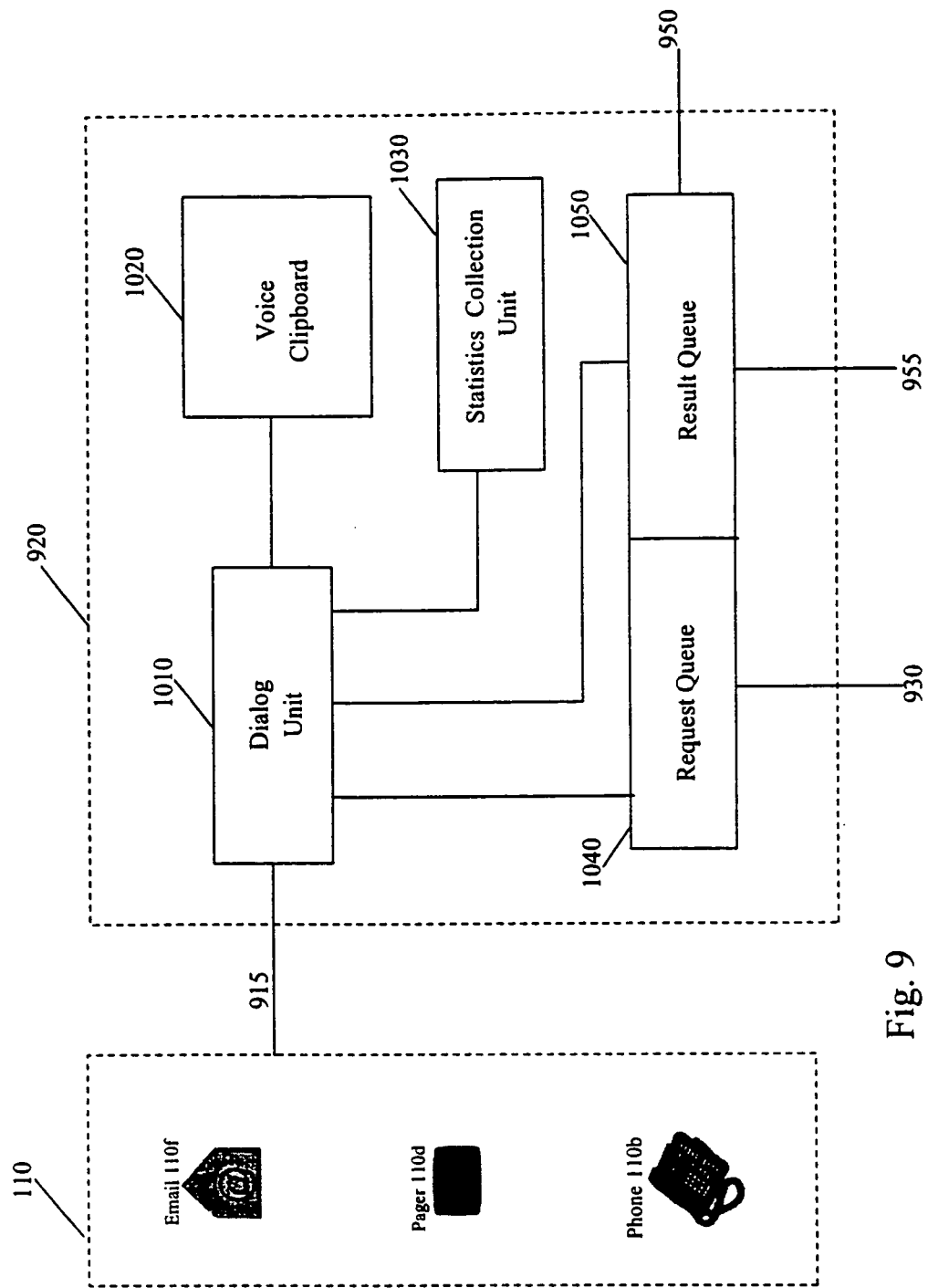
FIG. 9 depicts the high-level architecture of a multimodal information service application that enables voice-enabled Internet access according to of embodiments of the present invention.

In FIG. 9, a multimodal information service called voice-enabled Internet access service is shown with the environment in which this service operates. The voice-enabled Internet access service allows an information user to "converse with the web." For example, an information user may request web content during a conversation on a phone with the service provider. The requested web content, once retrieved from a web page, can be read to the information user instead of being displayed on a screen.

As shown in FIG. 9, the information user 110 communicates with a voice-enabled Internet service 920 via a network 910 to request a service. The communication may take the form of voice or speech. The (voice) request is processed by the voice-enabled Internet service 920 and relevant information necessary to perform the service may be extracted. Such information may include the address of the web page where the requested web content is located (e.g., a URL address) or the particular content on that page (e.g., the news story of the day on, for example, CNN's web site).

Based on the relevant information extracted from the request, the voice-enabled Internet access service 920 interacts with the multimodal platform 140 to obtain the requested web content and to generate the requested content in its destination modality (e.g., voice or text). The voice-enabled Internet access service 920 may first send the relevant information (e.g., the URL of the web page) to the application interface mechanism 510. Such information may then be passed onto the data retrieval mechanism 520 which may retrieve the requested content in text form from the specified web page from websites 150c.

The retrieval may be facilitated by a standard interface such as Voice Extensible Markup Language (Voice XML) 940. The retrieved web content is then rendered into destination modality. For example, if the destination modality is voice, the text web content may be rendered into speech data through the text-to-speech (TTS) renderer (FIG. 5) in the multimodal data rendering mechanism 530 and the text-to-speech engine 645 (FIG. 5) in the multimodal server 430. The rendered (or adapted) speech data is then forwarded to an appropriate data channel in data channels 720 through the telephony server 660 (FIG. 5) in the multimodal server 430 and the channel switching mechanism 710.

The web content may also be requested in a different destination modality. For example, the information user 110 may request web content being sent by facsimile to a particular facsimile machine. In this case, the multimodal platform 140 generates the requested content in requested facsimile form.

The requested web content may also be pre-stored in the adapted data storage 420. That is, particular web content may be accessed, converted into speech data, and stored, as adapted speech data, into the adapted data storage 420 prior to a requested service. In this case, the requested information may be directly retrieved in its destination modality from the adapted data storage 420.

FIG. 9 depicts the internal structure of the voice-enabled Internet access service 920 according to embodiments of the present invention. In FIG. 9, the voice-enabled Internet access service 920 may include a dialog unit 1010, a voice clipboard 1020, a request queue 1040, a result queue 1050, and a statistics collection unit 1030. The dialog unit 1010 in FIG. 10 interacts with the information user 110 by conducting a conversation or dialogs, through which the user's service request may be acquired in an interactive fashion. The dialog between the information user 110 and the dialog unit 1010 may be recorded in the clipboard 1020 in a manner that complies with certain standard such as extensible Markup Language (XML).

The user's request obtained from the conversation is queued in the request queue 1040 which is then accessed by the application interface mechanism 510 in the multimodal platform 150 through a connection 930. To facilitate the voice-enabled Internet access service 920, the multimodal platform 150 takes the request and returns the requested information in its destination modality (speech or voice) to the result queue 1050 via connection 950. The dialog unit 1010 retrieves the returned requested information (the web content in its speech form) from the result queue 1050 and sends back to the information user 110.

Figure 10:
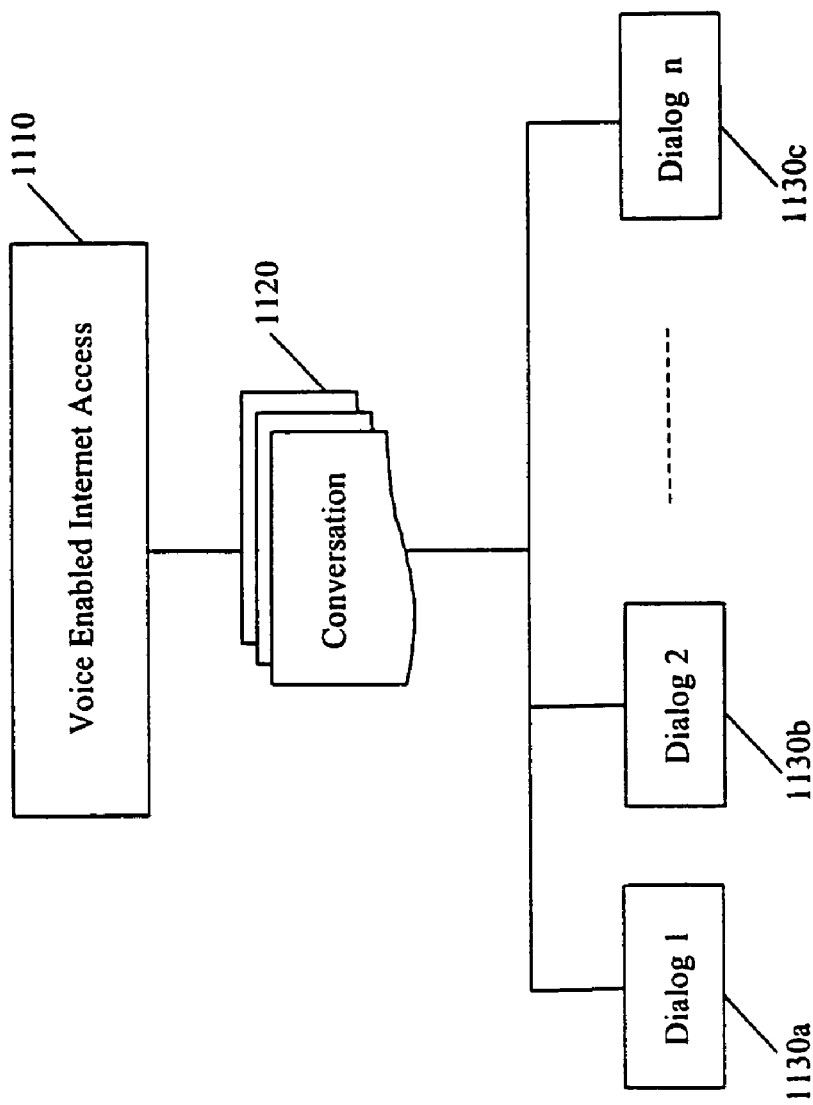
FIG. 10 illustrates how a conversation is constructed based on dialogs in voice-enabled Internet access according to of embodiments of the present invention.

The conversation between the information user 110 and the voice-enabled Internet access service application 920 may include a plurality of dialogs, each of which may comprise a prompt (from the voice-enabled Internet access service application 920) and a response (from the information user 110). This relationship is shown in FIG. 10, in which voice-enabled Internet access may be invoked by one or more conversations 1130, each of which may include a plurality of dialog sessions 1130*a*, 1130*b*, . . . 130*c*. A dialog session may be defined as one or more prompt-response pairs. For example, a prompt may be "Please state account number", and a corresponding response to this prompt may be "123A".

Dialog sessions contain useful data. For example, relevant information such as the URL address for the desired web content may be specified during dialog sessions. By analyzing the dialog sessions, various aspects of a service request may be identified. Dialog sessions may also be saved in the voice clipboard 1020. There may be different ways of utilizing the dialog content stored in the voice clipboard 1020. For example, the dialog sessions recorded in the voice clipboard may be used for quality assurance. Voice responses from the information user 110 may be recorded so that they can be analyzed at a future time.

Another and different use of the voice clipboard 1020 may be to facilitate the transfer of the dialog data across heterogeneous systems. For example, the voice clipboard 1020 may encode recorded dialog sessions based on a schema defined using a standard (e-g., XML) so that when the content of the voice clipboard 1020 is marshaled to a different system, the content is persistent.

Figure 11:
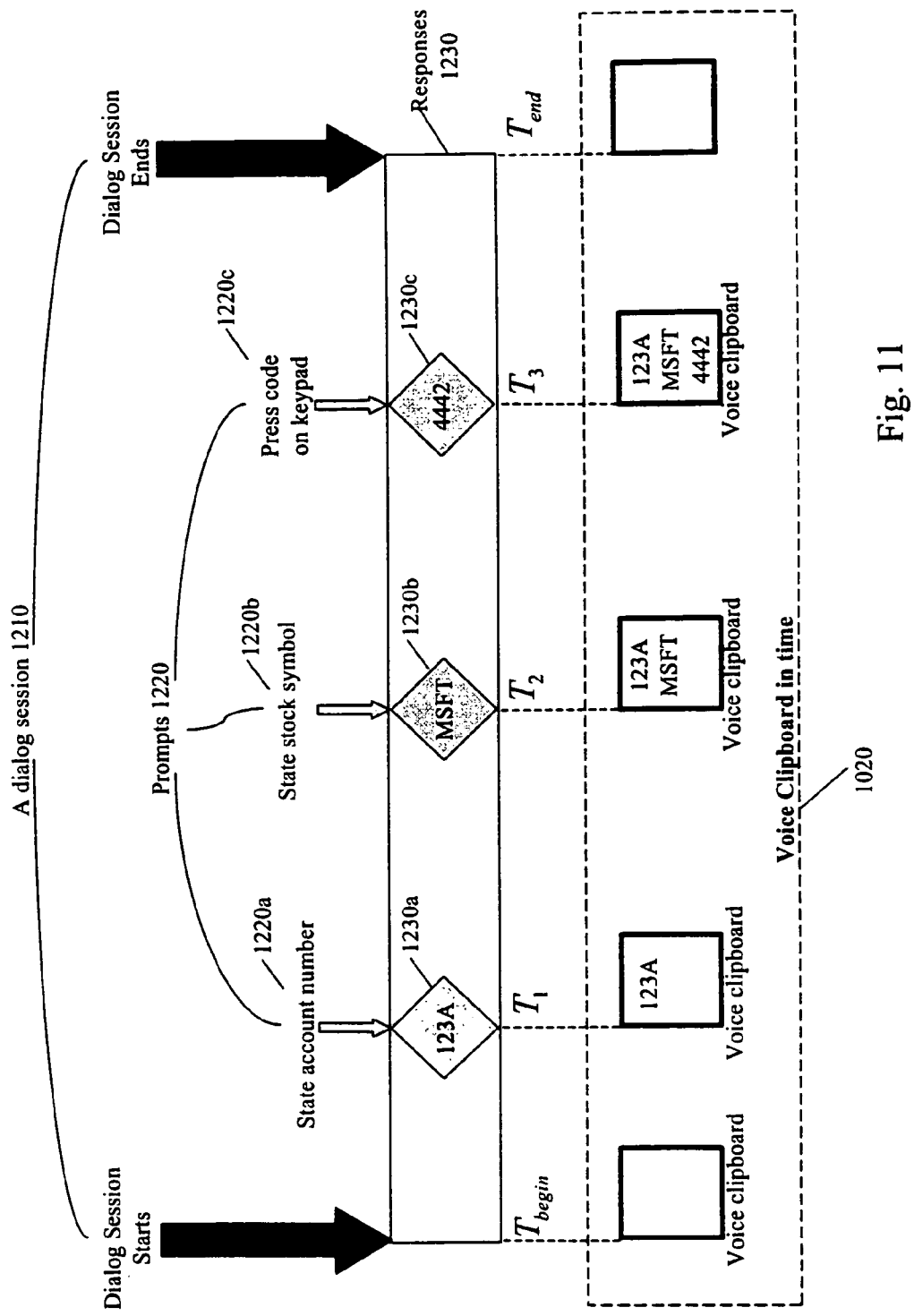
FIG. 11 illustrates an exemplary use of a voice clipboard in voice-enabled Internet access according to of embodiments of the present invention.

FIG. 11 illustrates an exemplary use of the voice clipboard 1020 according to the present invention. In FIG. 11, a dialog session 1210 starts at time $T_{begin}$ and ends at time $T_{end}$. The clipboard 1020 contains no data at time $T_{begin}$. The content that is put into the clipboard 1020 changes with time during the course of the dialog session 1210. In FIG. 11, the dialog session 1210 includes prompts 1220, which includes three prompts 1220*a* 1220*b*, 1220*c*, and responses 1230, which includes three responses "123A" 1230*a*, "MSFT" 1230*b*, and "4442" 1230*c*.

At time $T_3$, the dialog unit 1010 prompts the information user 110 "State account number" (1220*a*). After the prompt 1220*a*, the information user 110 responses by saying "123A" (1230*a*) which is stored in the clipboard 1020 (123A). At time $T_3$, the dialog unit 1010 prompts the information user 110 "State stock symbol". When the information 110 responds the prompt by saying a stock symbol "MSFT", which is appended into the clipboard 1020 so that the content in the clipboard 1020 becomes "123A MSFT" at this point. Then, at time $T_3$ the dialog unit 1010 prompts the information user 110 "Press the code on keypad" and the information user 110 responds the prompt by pressing "4442" on the keypad, which is again appended to the clipboard 1020. Therefore, after time $T_3$ the content stored in the clipboard 1020 is "123A MSFT 4442".

Figure 12:
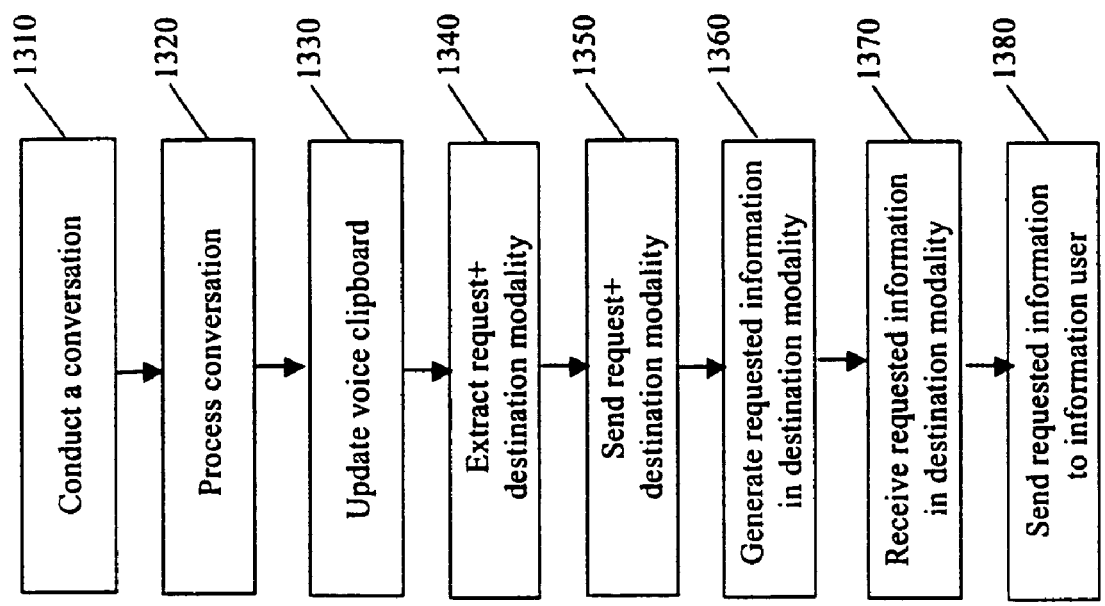
FIG. 12 is an exemplary flowchart for voice-enabled Internet access process according to of embodiments of the present invention.

FIG. 12 is an exemplary flowchart for the voice-enabled Internet access service 920 according to embodiments of the present invention. A conversation is first conducted at act 1310 between the dialog unit 1010 and the information user 110. During the conversation, the information user 110 requests a service from the voice-enabled Internet access service 920. The conversation is processed at act 1320. The processing at act 1320 extracts useful information, some of which may be used to update, at act 1330, the voice clipboard 1020.

Other relevant information that is necessary to facilitate the requested service is also extracted from the conversation at act 1340. For instance, the relevant information includes the content being requested, the locator of the desired content, and the destination modality used to deliver the requested content. Such relevant information is sent, at act 1350, to the multimodal platform 140.

Based on the relevant information associated with the request, the desired content in its destination modality is generated, at act 1360 by the multimodal platform 140, from the web content in its source modality retrieved from specified web site. The voice-enabled Internet access service application 920 receives the requested content at act 1370 from the multimodal platform 140 and then sends, at act 1380, it to the information user 110.

The voice-enabled Internet access service 920 may, for example, be applied to a customer web site which delivers real-time current traffic reports. The web pages containing the traffic reports can be accessed by the data retrieval mechanism 520 of the multimodal platform 140. A user wishing to hear a traffic report uses a communication device (e.g., a computer for e-mail reports, a pager, or a telephone) to access the traffic web site through the voice-enabled Internet access service 920. The user navigates the traffic web site using voice commands. The voice-enabled Internet access service 920 provides the user with the appropriate web page content based on the user's requests.

Figure 13:
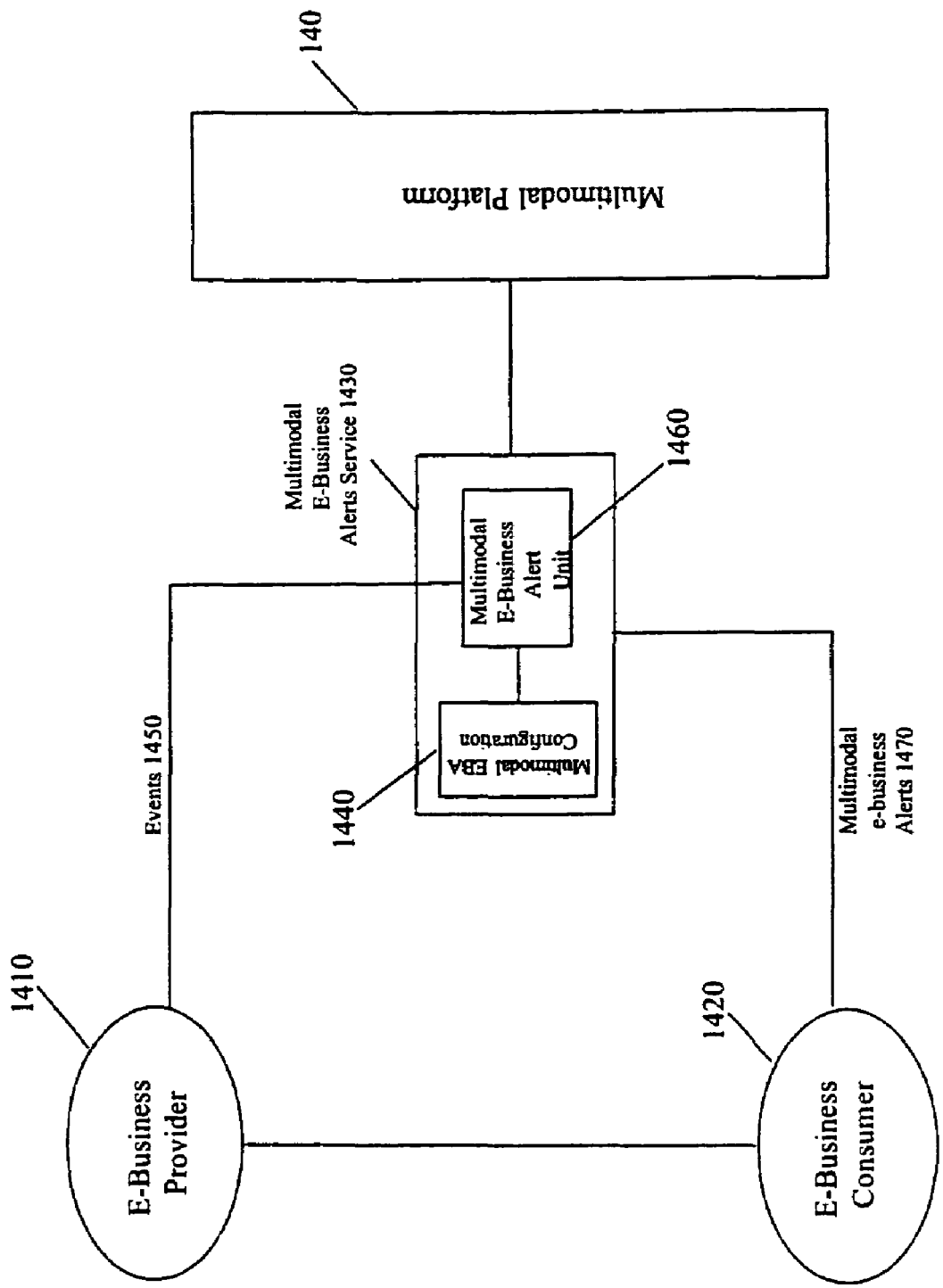
FIG. 13 depicts the high-level architecture of a multimodal e-business alert service built on top of a multimodal platform according to of embodiments of the present invention.

FIG. 13 illustrates a different example of offering a multimodal information service by building an MI service application based on the multimodal platform 140. FIG. 13 shows the structure of a multimodal e-business alert service, which provides proactive notification of events via different modalities or channels (e.g., voice, text pager, e-mail, and facsimile). The multimodal e-business alert service enables a business to proactively inform their consumers about any event via e-mail, facsimile, pager, or voice. The notification may cascade over channels. For example, the multimodal e-business alert service may notify consumers by voice first and then, if the voice notification encountered any problem (e.g., phone is busy or answering machine picks up), the multimodal e-business alert service may choose a different channel to notify the consumers (e.g., by a text pager or e-mail).

The multimodal e-business alert service shown in FIG. 13 includes an e-business provider 1410 (corresponding to the information source 150 in FIG. 1), a e-business consumer 1420 (corresponding to the information user 110 in FIG. 1), an MI service application that provides multimodal e-business alert service 1430, and the multimodal platform 140.

In FIG. 13, the e-business consumer 1420 is a customer of the e-business provider 1410. Through the multimodal e-business alert service 1430, the e-business provider 1410 sends e-business alerts 1470 to the e-business consumer 1420. The service is requested through events 1450 that may be submitted as, for example, XML documents. A multimodal e-business alert 1470 is constructed by a multimodal e-business alert unit 1460, which operates the e-business alert service according to a multimodal e-business alert configuration (EBA configuration) 1440.

An e-business alert may be constructed in multiple modalities and the e-business alerts in different modalities may be sent under different conditions. Such conditions may be initially specified by the e-business consumer 1420 and stored by the e-business provider 1410 and used whenever the e-business provider 1410 desires to sent the e-business consumer an e-business alert. For example, the e-business consumer 1420 may specify that an e-business alert should be first sent to a particular wireless phone in voice and if there is no one to answer the phone, send the alert via electronic mail to a particular e-mail address. Such a multimodal e-business alert specification (or multimodal EBA specification) is used to construct the events or alert requests 1450 that instruct (through the events 1450) the multimodal e-business alert unit 1460 in terms of how to handle the e-business alert sent to the e-business consumer 1420.

Based on the multimodal EBA configuration and the multimodal EBA specification, the multimodal e-business alert unit 1460 interacts with the multimodal platform to generate alerts in different modalities and control the issuing of the alerts in the manner that is consistent with the multimodal EBA specification.

The EBA configuration 1440 specifies how the service should behave. For example, it may specify the locations of various queues or the manner for the multimodal e-business alert unit 1460 to communicate with different renderers in the multimodal platform 140. The EBA configuration 1440 may be stored in some storage or may be retrieved from a URL address whenever it is needed. The EBA configuration may be written in a structured manner and in some well defined language. For example, the EBA configuration may be constructed according to a schema defined using XML.

The EBA configuration 1440 is a detailed set of instructions that govern how a service should be run and contain two types of information:

information specifying the locations of queues and other operating instructions.

information specifying the manner of communication with renderers supporting a specific interface such as voice, e-mail, facsimile, or pager.

These two categories of information may be specified using, for example, XML structures shown below:

```
<SERVICE_CONFIG>
    <CONFIG_DATA>
    ....
    </CONFIG_DATA>
    <RENDERER>
    ...
    </RENDERER>
</SERVICE_CONFIG>
``` where, the <CONFIG_DATA> block contains the following elements:

Below, an example <CONFIG_DATA> block is shown:

```
<CONFIG_DATA>
    <ID>SARGE_EBA1</ID>
    <LOGFILEQUEUE>PUBLIC=ODD25765-EC9C-4981-9691-
        3365329FD819</GOGFILEQUEUE>
    <LOGLEVEL>4</LOGLEVEL>
    <RESPONSE_QUEUE<PUBLIC_D3036CC4-FA34-4CDD-9387-
        621E3E089785</RESPONSE_QUEUE>
    <INCOMING_QUEUE>PUBLIC_D205CC89-B8EB-49FC-858C-
        ACE8D1A5E5D9</INCOMING_QUEUE>
    <DB_CONNECTION>Provider=SQLOLEDB; Data
        Source=CRUSHER; Initial
        Catalog-test3_webversa30; User Id-sa;
        Password-""</DB-CONNECTION>
    <QUEUE_TIMEOUT_MSECS>10000</QUEUE_TIMEOUT_
    MSECS>
    <THREAD_TIMEOUT_MSECS>10000
    </THREAD_TIMEOUT_MSECS>
    <DB_TIMEOUT_MSECS>30000</DB_TIMEOUT_MSECS>
    <<DB_TIMESPAN_MSECS>60000</DB_TIMESPAN_MSECS>
    <INPUT_THREADS>1</INPUT_THREADS>
    <RESPONSE_THREADS>1</RESPONSE_THREADS>
    <DB_SCANNER_THREADS>1</DB_SCANNER_THREADS>
</CONFIG_DATA>
```

In addition to the configuration block, the EBA configuration 1440 also specifies the renderers used by the EBA service. This is achieved using the <RENDERER> block which uses the following tags:

| Element Name | Description |
| --- | --- |
| RENDERER_TYPE_NAME | The type of renderer. Legal values are: VOICE, FACSIMILE, PAGER, E-MAIL |
| ID | A unique identifier for this renderer. This ID must be unique in this file only. It is used internally by the EBA to identify a renderer. |
| REQUEST_QUEUE | The name of a queue into which request for the services of this renderer are placed. Note that the renderer itself must be configured properly to be listening to this queue. |

| Element Name | Description |
| --- | --- |
| LOGFILEQUEUE | All log entries are sent to this queue. |
| LOG_LEVEL | The level of logs collected. There are four levels defined in the system. |
| DB_CONNECTION | The Database connection information where the Alerts will be stored including "Timed Alerts". |
| INCOMING_QUEUE | Alerts requests that must be processed as soon as possible are placed in this queue. |
| RESPONSE_QUEUE | Alerts that are in process are stored here. The entries are always made by other renderers. |
| QUEUE_TIMEOUT_MSECS | The number of milliseconds before a request to read a message from a queue times out. This value is used to balance the impact on the MQ server. |
| THREAD_TIMEOUT_MSECS | Number of milliseconds for threads to timeout as they process requests. |
| INPUT_THREADS | Number of threads dedicated to processing input requests. |
| RESPONSE_THREADS | Number of threads dedicated to processing requests in process. |
| DB_TIMEOUT_MSECS | The number of milliseconds before a request to read a message from a database times out. |
| DB_TIMESPAN_MSECS | Number of milliseconds for a thread to wake up periodically to read messages from database. |
| <DB_SCANNER_THREADS | Number of Database connection threads. |

An example RENDERER block is shown below:

```
<RENDERER>
    <RENDERER_TYPE_NAME>VOICE</RENDERER_TYPE_NAME>
    <ID>VISOR_CTMR1</ID>
    <REQUEST_QUEUE>PUBLIC=5BA06F2C-B0F8-45A3-BA1F-95E3810AA6E4</REQUEST_QUEUE>
</RENDERER>
```

The RENDERER_TYPE_NAME can be one of the following—VOICE, E-MAIL, FACSIMILE, PAGER.

The ID should be unique in that configuration file.

The REQUEST-QUEUE is the queue into which an EBA push request is placed. The associated renderer may have to be configured to listen to this queue. This coordination is critical to push requests being processed properly.

A complete example EBA configuration schema is shown below.

```
<?xml version="1.0"?>
<?xml:namespace name="urn:uuid:E64325C2-837B-4fe6-A4DF-C5F30B7F9A78/"
as_"WEBVERSA)EBA_CONFIG"/?>
<!--***************************************************************-->
<!-- XML-Data Schema for the WebVersant EBusAlerts Configuration-->
<!-- Version: 1.0
<!-Last Modified: 04/26/2000
<!--***************************************************************-->
<Schema xmlns="urn:schemas-microsoft-com:xml-data:
Xmlns:dt="urn:schemas-microsoft-com:datatypes">
    <!--***************************************************************-->
    <!--Base elements used in the configuration
    <!--***************************************************************-->
    <ElementType xmlns="" name="LOGFILEQUEUE" content="testOnly"
model="closed"/>
    <ElementType xmlns="" name="LOG_LEVEL" CONTENT="testOnly"
model="closed"/>
    <ElementType xmlns="" name="INCOMING_QUEUE" CONTENT= "text Only"
model="closed"/>
    <ElementType xmlns="" name="RESPONSE_QUEUE" content="textOnly"
model="closed"/>
    <ElementType xmlns="" name="DB_CONNECTION" content="textOnly"
model="closed"/>
    <ElementType xmlns="" name="QUEUE_TIMEOUT_MSECS"
content="textOnly" model="closed"/>
    <ElementType xmlns=""name="THREAD_TIMEOUT_MSECS"
content="textOnly" model="closed"/>
    <ElementType xmlns="" name="INPUT_THREADS" content="textOnly"
model="closed">
    <ElementType xmlns="" name="RESPONSE_THREADS" content="textOnly"
model="closed"/>
    <ElementType xmlns="" name="DB_TIMESPAN_MSECS"
content="textOnly" model="closed"/>
    <ElementType xmlns="" name="DB_TIMEOUT_MSECS" content="textOnly"
Model="closed"/>
    <ElementType xmlns="" name="DB_SCANNER_THREADS"
Content="textOnly" model="closed"/>
    <ElementType xmlns="" name="RENDERER_TYPE_NAME"
Content="textOnly" model="closed"/>
    <ElementType xmlns="" name="ID" content="textOnly"
Model="closed"/>
    <ElementType xmlns="" name="REQUEST_QUEUE" content="textOnly"
Model="closed"/>
    <!--***************************************************************-->
    <!--Denfinition of a single renderer                                -->
    <!--***************************************************************-->
    <ElementType xmlns="" name="RENDERER" content="eltOnly"
Model="closed">
        <element type="RENDERER_TYPE_NAME" minOccurs="1"
maxOccurs="1"/>
        <element type="ID" minOccurs="1" maxOccurs="1"/>
        <element type="REQUEST_QUEUE" minOccurs="1" maxOccurs="1"/>
    </ElementType>
    <!--***************************************************************-->
    <!-CONFIG-DATA - Basic configuration information                    -->
    <!--***************************************************************-->
    <ElementType xmlns="" name="CONFIG_DATA" content="eltOnly" model="closed">
        <element type="LOGFILEQUEUE" minOccurs="1" maxOccurs="1"/>
        <element type="LOG_LEVEL" minOccurs="1" maxOccurs="1"/>
        <element type="INCOMING_QUEUE" minOccurs="1" maxOccurs="1"/>
        <element type="RESPONSE_QUEUE" minOccurs="1" maxOccurs="1"/>
        <element type="DB_CONNECTION" minOccurs="1" maxOccurs"1"/>
        <element type="QUEUE_TIMEOUT_MSECS"    minOccurs="1"
                                                maxOccurs="1"/>
```

```
    <element type="THREAD_TIMEOUT_MSECS"   minOccurs="1"
                                           maxOccurs="1"/>
    <element type=INPUT_THREADS" minOccurs="1"  maxOccurs="1"/>
    <element type="RESPONSE_THREADS"            minOccurs="1"
                                                maxOccurs="1"/>
    <element type="DB_TIMESPAN_MSECS"           minOccurs="0"
                                                maxOccurs="1"/>
    <element type="DB_TIMEOUT_MSECS"            minOccurs="0"
                                                maxOccurs="1"/>
    <element type="DB_TIMESPAN_MSECS"           minOccurs="0"
                                                maxOccurs="1"/>
</Elementtype>
<!--*************************************************************-->
<!-- EBA_SERVICE
<!--*************************************************************-->
<ElementType xmlns="" name="EBA_SERVICE" content="etlOnly"
model="closed">
    <element type="CONFIG_DATA" minOccurs="1" maxOccurs="1"/>
    <element type="RENDERER" minOccurs="1" maxOccurs="&"/>
</Element Type>
<!--*************************************************************-->
<!--Root element for the E-Business Alert config -->
<!--*************************************************************-->
<ElementType xmlns="" name="SERVICE_CONFIG" content="etlOnly"
model="closed">
    <element type="EBA_SERVICE" minOccurs="1" maxOccurs="1"/>
</ElementType>
</Schema>
```

A Sample EBA Configuration constructed based on the above schema is shown below.

```
<?xml version="1.0"?>
<SERVICE_CONFIG>
    <!--<EBA_SERVICE xmlns ="x-
schema:http://localhost/ebaconfig.schema"> -->
    <EBA_SERVICE>
        <CONFIG_DATA>
            <ID>SARGE_EBA1</ID>
            <LOGFILEQUEUE>PUBLIC=0DD25765-EC9C-4981-
9691-3365329FD819</LOGFILEQUEUE>
            <LOGLEVEL>4</LOGLEVEL>
            <RESPONSE_QUEUE>PUBLIC=D3036CC4-FA34-
4CDD-9387-621E3E089785</RESPONSE_QUEUE>
            <INCOMING_QUEUE>PUBLIC=D205CC89-B8EB-
49FC-858C-ACE8D1A5E5D9</INCOMING_QUEUE>
            <DB_CONNECTION>Provider=SQLOLEDB; Data
Source=CRUSHER; Initial
Catalog=test3_webversa30; User Id=sa;
Password=""</DB_CONNECTION>
            <QUEUE_TIMEOUT_MSECS>10000</QUEUE_
TIMEOUT_MSECS>
            <THREAD_TIMEOUT_MSECS>10000
</THREAD_TIMEOUT_MSECS>
            <DB_TIMEOUT_MSECS>30000<DB_TIMEOUT_
MSECS>
            <DB_TIMESPAN_MSECS>60000</db_TIMESPAN_
MSECS>
            <INPUT_THREADS>1</INPUT_THREADS>
            <RESPONSE_THREADS>1</RESPONSE_THREADS>
            <DB-SCANNER_THREADS>1</DB_SAANNER_
THREADS>
        </CONFIG_DATA>
        <RENDERER>
            <RENDERER_TYPE_NAME>VOICE</RENDERER_
TYPE_NAME>
            <ID>VISOR_CTMR1</ID>
            <REQUEST_QUEUE>PUBLIC=5BA06F2C-B0F8-45A3-
BA1F-95E3810AA6E4</REQUEST_QUEUE>
        </RENDERER>
        <RENDERER>
            <RENDERER_TYPE_NAME>E-MAIL</RENDERER_
TYPE_NAME>
            <ID>HANNIBAL_SMTP1</ID>
```

-continued

```
            <REQUEST_QUEUE>PUBLIC=0DD25765-EC9C-4981-
9691-3365329FD819</REQUEST_QUEUE>
        </RENDERER>
        <RENDERER>
            <RENDERER_TYPE_NAME>PAGER</RENERER_
TYPE_NAME>
            <ID>SXIANG</ID>
            <REQUEST_QUEUE>PUBLIC=E6822B2B-FA94-47E0-
B971-D41EB73EEAF7</REQUEST_QUEUE>
        </RENDERER>
    </EBA_SERVICE>
</SERVICE_CONFIG>
```

An event 1450 requests an e-business alert service through an multimodal EBA specification which may comprise two types of information: an EBA history and a push. An EBA history is a record of any activity performed on the request as it moves through the system. The push specifies the means to deliver an alert, which may include a default, and optionally an alternative, modality or channel to deliver the alert that may be, for example, voice, pager, e-mail, or facsimile.

Figure 14:
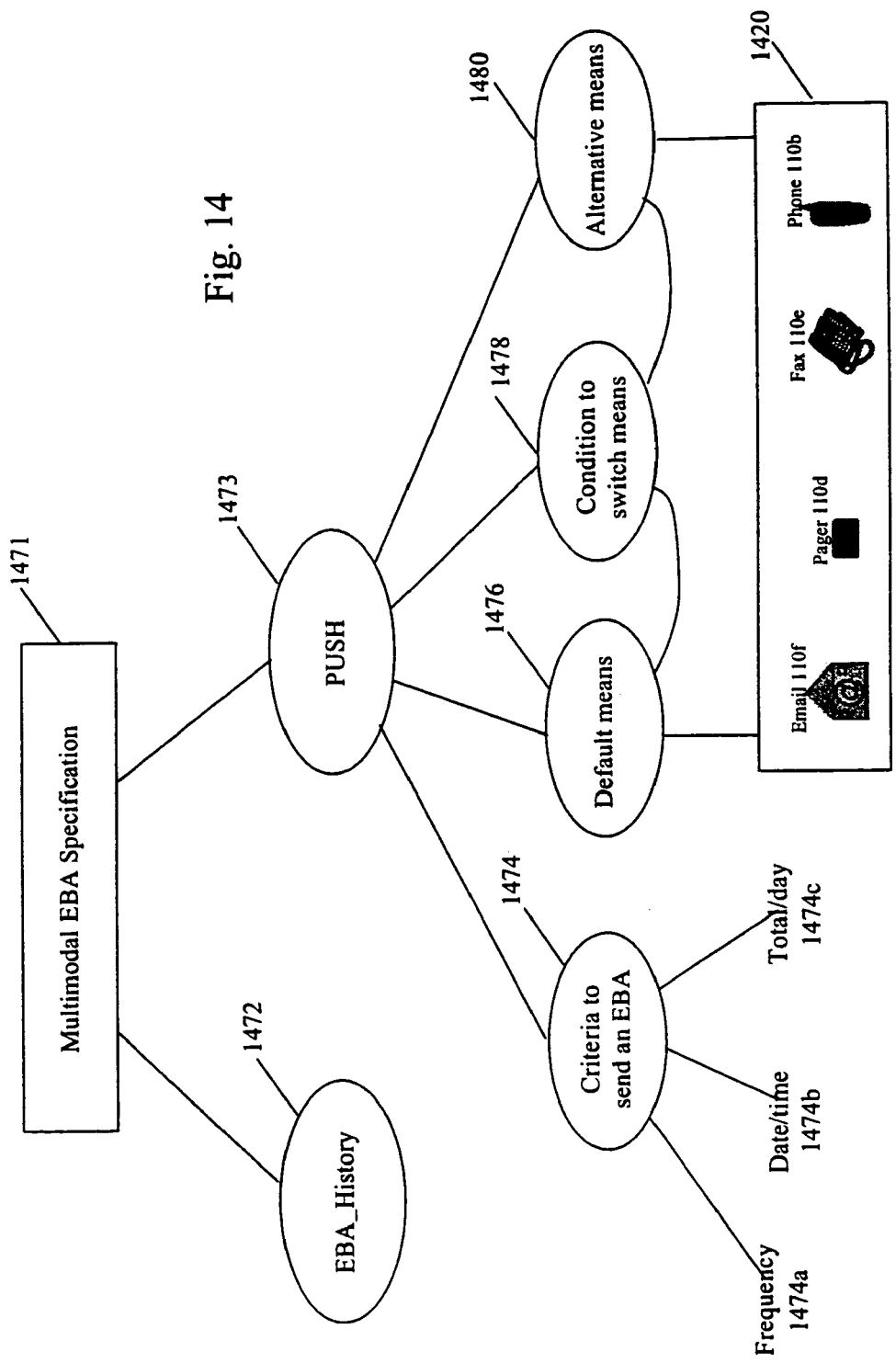
FIG. 14 depicts the structure of a multimodal e-business alert specification according to of embodiments of the present invention.

FIG. 14 shows an exemplary structure of an multimodal EBA specification 1471. In FIG. 14, the multimodal EBA specification 1471 may comprise two categories of information: an EBA history 1472 and a push 1473. The push 1473 defines how an EBA alert is pushed out of the system. For example, the push may be defined according to some criteria to send an EBA (1474) which may include the frequency (1474*a*) to send, the date and time (1474*b*) to send, and the total number/day (1474C) to send. The push 1473 may specify a default means (1476) to send an EBA and an alternative means (1480) to send an EBA under certain situation defined by condition 1478. The means (including both default means 1476 and alternative means 1480) through which an EBA is sent may include e-mail, facsimile, pager, and phone.

The multimodal EBA specification may be constructed as an XML document according to an XML schema defined for an EBA service. Below, an exemplary XML schema for an EBA service is described. In such a schema, the root element may be called EBA-SERVICE. For example,

```
<ElementType name="EBA_SERVICE" content="etlOnly"
model="closed">
    <element type="PUSH" minOccurs="1" maxOccurs="1"/>
    <element type="EBA_HISTORY" minOccurs="1"
    maxOccurs="1"/>
    <element type="DATA_EXCHANGE" minOccurs="1"
    maxOccurs="1"/>
</ElementType>
```

This element can contain the following child elements:

| Name | Cordinality | Description |
| --- | --- | --- |
| PUSH | 1 | An E-Business Alert instance. Only one is allowed in a given document. |
| EBA_HISTORY | 1 | A collection of records tracking the processing of an alert request. |
| DATA_EXCHANGE | 1 | A collection of Name and Values that need to be exchanged between the E-Business Alert Service and the Renderers |

Below, each of the above listed elements is described. The PUSH element represents a single instance of an e-business alert to be pushed out of the system. The schema fragment is shown below:

```
<ElementType name="PUSH" content="eltOnly" model="closed">
    <attribute type="START" required="yes"/>
    <attribute type=" ALERT_ID" required=" yes"/>
    <attribute type="ALERT_NAME" required="yes"/>
    <attribute type="REQUEST_DATE_TIME" required="no"/>
    <element type="DESCRIPTION" minOccurs="1"
    max0ccurs="1"/>
    <element type="CURRENT_PUSH" minOccurs="1"
    maxOccurs="1"/>
    <element type="RESPONSE_QUEUE" minOccurs="0"
    maxOccurs="1"/>
    <element type="RESULT_POST" minOccurs="1"
    maxOccurs="1"/>
    <element type="VOICE" minOccurs="0" maxOccurs="*"/>
    <element type="E-MAIL" minOccurs="0" maxOccurs="*"/>
    <element type="PAGER" minOccurs="0" maxOccurs="*"/>
</ElementType>
```

Each of the attribute types appeared in the above PUSH schema is further described below:

| Name | Description |
| --- | --- |
| START | If this is the first time the request is being processed (i.e. there are zero activity records), the value of this attribute is used to determine the first channel to alert. The value should be the ID of one of the PUSH elements |
| ALERT_NAME | User Defined field to enter a User ID or Name to distinguish each E-Business Alert. Optional. Will help in relating an alert in the database to a specific alert request made by an user. |
| ALERT_ID | Alert ID generated by the EBA Service during processing. |
| REQUEST_DATE_TIME | The time at which the alert should be delivered. If this is blank, then it is delivered as soon as possible. |

Each of the element types appeared in the above PUSH schema is further described below:

| Name | Cardinality | Description |
| --- | --- | --- |
| DESCRIPTION | 1 | A textual description of the event that is persisted with the alert history. |
| CURRENT_PUSH | 1 | The ID of the push element (VOICE/E-MAIL/PAGER) to be processed. This value is blank at first. As rules are applied by E-Business Alerts service, this value is updated to point to the ID of the element that should be processed next. |
| RESPONSE_QUEUE | 1 | Name of the Response Queue on which the EBA Service is Listening [This is also the Queue that the Renderers send the result message after processing the Alert request]. |
| RESULT_POST | 1 | URL where the results of an Alert attempt can be posed to. |
| VOICE | >=0 | A voice alert. |
| PAGER | >=0 | A pager alert. |
| E-MAIL | >=0 | An e-mail alert. |

Each of the element types above may have its own schema. For example, for element type VOICE, the below schema may be defined:

```
<ElementType name="VOICE" content="eltOnly" model="closed">
    <attribute type="NAME" required="yes"/>
    <attribute type="CURREN_ATTEMPT_ID" required ="no"/>
    <attribute type="RECIEVE_DATE_TIME" required ="yes"/>
    <attribute type="END_DATE_TIME" required ="no"/>
    <element type="PHONE_NUMBER" minOccurs="1" maxOccurs="1"/>
    <element type="APPLICATION_ID" minOccurs="0" maxOccurs="1"/>
    <element type="RESULT_ACTION" minOccurs="0" maxOccurs="*"/>
</ElementType>
```

The attribute type ID is described below:

| Name | Description |
| --- | --- |
| NAME | An identifier for the push. This ID must be unique in this document. |
| CURRENT_ATTEMPT_ID | Current Attempt ID generated by the EBA Engine and inserted in the Alert XML |
| RECEIVE_DATE_TIME | The Date Time stamp when the EBA Engine processed the EBA Alert Request before sending the Alert to the respective Alert Queues such as Voice Queue, E-mail Queue, Pager Queue. |
| END_DATE_TIME | The Date Time stamp when the Renderer Service should stop processing EBA Alert Requests. The difference between the Receive_Date_Time and the End_Date_Time is the time window that the user defines during which the alert has to be attempted. If the current time is beyond the End_Date_Time the renderer services will stop processing the alert request. |

The children element types in the VOICE schema are further described below:

| Name | Cardinality | Description |
| --- | --- | --- |
| PHONE_NUMBER | 1 | The phone number to call. |
| APPLICATION_ID | <=1 | The Name of the voice application to hand off to once the call is connected. |
| RESULT_ACTION | >=0 | A set of rules determining what to do based on the outcome of the push. |

The PHONE_NUMBER element has the following attribute.

| Name | Description |
| --- | --- |
| PHONE_TYPE | The Type of Phone System [U.S., International etc.] |

An exemplary schema for element type E-MAIL may be defined as below:

```
<ElementType name="E-MAIL" content="eltOnly" model="closed">
    <attribute type="NAME" required="yes"/>
    <attribute type="CURRENT_ATTEMPT_ID" required="no"/>
    <attribute type="RECEIVE_DATE_TIME" required="yes"/>
    <attribute type="END_DATE_TIME" required="no"/>
    <element type="TO_ADDRESS" minOccurs="1" maxOccurs="*"/>
    <element type="FROM_ADDRESS" minOccurs="1" maxOccurs="1"/>
    <element type="CC_ADDRESS" minOccurs="1" maxOccurs="*"/>
    <element type="BCC_ADDRESS" minOccurs="1" maxOccurs="*"/>
    <element type="SUBJECT" minOccurs="1" maxOccurs="1"/>
    <element type="BODY" minOccurs="1" maxOccurs="1"/>
    <element type="ATTACHMENT_URL" minOccurs=""1" maxOccurs="*"/>
    <element type="RESULT_ACTION" minOccurs="0" maxOccurs="*"/>
    <element type="APPLICATION_ID" minOccurs="0" maxOccurs="1"/>
</ElementType>
```

The attributes are described here:

| Name | Description |
| --- | --- |
| NAME | An identifier for the push. This ID must be unique in this document. |
| CURRENT_ATTEMPT_ID | Current Attempt ID generated by the EBA Engine and inserted in the Alert XML |
| RECEIVE_DATE_TIME | The Date Time stamp when the EBA Engine processed the EBA Alert Request before sending the Alert to the respective Alert Queues such as Voice Queue, E-mail Queue, Pager Queue. |
| END_DATE_TIME | The Date Time stamp when the Renderer Service should stop processing EBA Alert Requests. The difference between the Receive_Date_Time and the End_Date_Time is the time window that the user defines during which the alert has to be attempted. If the current time is beyond the End_Date_Time the renderer services will stop processing the alert request. |

This element can contain the following child elements:

| Name | Cardinality | Description |
| --- | --- | --- |
| TO_ADDRESS | >=1 | E-mail address to alert. This can also be the name of a list. |
| FROM_ADDRESS | 1 | Return address |
| CC_ADDRESS | >=1 | Copy e-mail to this address. |
| BCC_ADDRESS | >=1 | Blind copy e-mail to this address. |
| SUBJECT | 1 | Subject of the e-mail message. |
| BODY | 1 | Body of the e-mail message. This has an attribute TYPE that specifies whether the attachment is a TEXT or an URL etc. |
| ATTACHMENT | >=0 | A URL pointing to the location of the mail attachment. |
| RESULT_ACTION | >=0 | A set of rules determining what to do based on the outcome of the push. |
| APPLICATION_ID | <=1 | The Name of the voice application to hand off to once the call is connected. |

The attribute of the BODY element is described here:

| Name | Description |
|---|---|
| TYPE | Specifies the type of attachement. [TEXT or URL] etc. |

The ATTACHMENT element defines data unique to the PUSH required to complete the alert. The schema fragment is shown below:

```
-<ElementType name="ATTACHMENT" content="textOnly"
    Model="closed">
    <AttributeType name="NAME"dt:type="string"/>
        <attribute type="NAME" required="yes"/>
</ElementType>
```

The attributes are described here:

| Name | Description |
|---|---|
| NAME | The identifier of the value being passed to the alert service. |

All the above exemplary schemas for PUSH element types contain two common elements: RESULT_ACTION and DATA_EXCHANGE. RESULT_ACTION defines a set of rules that dictate how to react to the outcome of the underlying push. DATA_EXCHANGE defines a set of custom data that can be passed along with the underlying push.

Below, exemplary XML schemas for both RESULT_ACTION and DATA_EXCHANGE are described. The schema for RESULT_ACTION is shown below:

```
<ElementType name="RESULT_ACTION" content="eltOnly"
model="closed">
    <attribute type="SYSTEM_RESULT" required="yes"/>
    <attribute type="ACTION_OP" required="yes"/>
    <attribute type="RID" required="yes"/>
    <attribute type="RETRIES" minOccurs="0" maxOccurs="1"/>
    <attribute type="INTERVAL" minOccurs="0" maxOccurs="1"/>
</ElementType>
```

The attributes are described here:

| Name | Description |
|---|---|
| RID | Rule ID |
| ACTION_OP | A enumerated collection specifying the type of Logical action: OR, AND |
| NEXT_PUSH | The ID of the next PUSH to be applied. |
| SYSTEM_RESULT | Outcome of the current push. Value is updated by the service performing the alert — voice, e-mail, pager, facsimile. |
| RETRIES | Number of Retries In case SYSTEM_RESULT is satisfied |
| INTERVAL | Time Interval in Seconds that the Same Push needs to be Retried |

The exemplary schema for DATA_EXCHANGE is shown below:

```
<ElementType name="DATA_EXCHANGE" content="eltOnly"
    Model="closed">
    <element type="DATA" minOccurs="0" maxOccurs="*"/>
</ElementType>
The Data element consists the following child elements and attributes:
<ElementType name="DATA" content="eltOnly" model="closed">
    <attribute type="NAME" required="yes"/>
    <attribute type="SESSION" required="yes"/>
    <element type="VALUE" minOccurs="1" maxOccurs="1"/>
</ElementType>
```

The Data element contains the following attributes.

| Name | Description |
|---|---|
| NAME | Name of theVariable that is being exchanged. |
| SESSION | Specifies the Session # that defaults to 1 |

This element can contain the following child elements:

| Name | Cardinality | Description |
|---|---|---|
| VALUE | 1 | The Value of the NAME attribute is specified here. |

The EBA_HISTORY element is generated once an E-Business Alert has been process by the respective renderers. It defines the Attempts and the result of the Alert attempt. The EBA_HISTORY has the following schema:

```
<ElementType name="EBA_HISTORY" content-"eltOnly"
model="closed">
    <element type="EBA" minOccurs="0" maxOccurs=:"*"/>
    <element type="ACTIVITY" minOccurs="0" maxOccurs="*"/>
</ElementType>
    The EBA child element has the following schema:
<ElementType name="EBA" content="eltOnly" model="closed">
    <attribute type="NAME" required="yes"/>
    <attribute type="RID" required="yes"/>
    <attribute type="ATTEMPT_DATE_TIME" required="yes"/>
</ElementType>
```

The EBA element contains the following attributes:

| Name | Description |
|---|---|
| NAME | Name of the Push that was attempted. |
| RID | Rule ID attempted |
| ATTEMPT_DATE_TIME | The Date and Time when the push specified by the NAME attribute was attempted |

The ACTIVITY child element has the following schema:

```
<ElementType name="ACTIVITY" content="eltOnly" model="closed">
    <attribute type="ATTEMPT_ID" required="yes"/>
    <attribute type="NAME" required="yes"/>
```

-continued

```
<attribute type="SYSTEM_RESULT" require="yes"/>
<attribute type="USER_RESULT" required="No"/>
<attribute type="ATTEMPT_DATE_TIME" required="yes"/>
<attribute type="NEXT_ATTEMPT_NAME" required="yes"/>
```

-continued

```
<attribute type="DISPOSITION" required="yes"/>
<attribute type="SESSION_ID" required="yes"/>
</ElementType>
```

The ACTIVITY element contains the following attributes:

| Name | Description |
| --- | --- |
| ATTEMPT_ID | Name of the Push that was attempted. |
| NAME | Rule ID attempted |
| SYSTEM_RESULT | Specifies the result that the renderers provided after the Alert was attempted. The SYSTEM_RESULT will be the native result code obtained by the respective renderers after they have attempted to send the Alert. |
| USER_RESULT | Specifies any user defined result that was passed back to the E-Business Alerts Service by the Renderers. |
| NEXT_ATTEMPT_NAME | Name of the next Push Attempt that the EBA will process. |
| DISPOSITION | The disposition of the Alert while posting results to the RESULT_POST URL. There are three possible values: FINAL, PROCESSING_NEXT, AND RETRY |
| ATTEMPT_DATE_TIME | The Date and Time when the push specified by the NAME attribute was attempted |
| SESSION_ID | In case the alert attempted is a Voice alert then the Voice Renderer system inserts a Session_ID that is the same as the Session_ID created by the Voice Renderer as part of the Session data. |

Based on the above defined schemas, a complete e-business alert (EBA) schema is shown below Based on the above-defined schemas, a complete e-business alert (EBA) schema is shown is shown below:

```
<?xml version="1.0"?>
<?xml:namespace name="urn:uuid:E64325C2-837B-4fe6-A4DF-C5F30B7F9A78/" as="WEBVERSA_ESA"/?>
<!--************************************************************-->
<!-- xml-Data Schema for the Webversa E-Business Alerts Service
-->
<!-- Version: 2/000 -->
<!-- Created: 12/12/2000           -->
<!--************************************************************-->
<Schema xmlns="urn:schemas-microsoft-com:xml-data"
xmlns:dt="urn:scheas-microsoft-com:datatypes">
<!--************************************************************-->
<!-- Base datatypes for an E-Business Alert           -->
<!--************************************************************-->
   <AttributeType name="NAME" dt:type="string" />
<!--************************************************************-->
<!-- Base elements used in the major E-Business Alert elements -->
<!--************************************************************-->
   <ElementType name="Value" content="textOnly" model="closed"
<!--************************************************************-->
<!-- Element for Data_Exchange on an Alert
<!--************************************************************-->
   <AttributeType name="SESSION" dt:type="boolean" Default="true" />
<ElementType name="DATA" content="eltOnly" model="closed">
        <attribute type="NAME" required="yes" />
        <attribute type="SESSION" required="no" />
        <element type="VALUE" minOccurs="1" maxOccurs="1" />
</ElementType>
</ElementType name="DATA_EXCHANGE" content="eltOnly" orders="seq">
              <element type="DATA" minOccurs="0" maxOccurs="*" />
</ElementType>
<!--************************************************************-->
<!-- Element for result actions on an Alert           -->
<!--************************************************************-->
```

-continued

```
                <AttributeType name= "USER_RESULT" dt:type= "string" / >
                <AttributeType name= "RID" dt: type= "string" />
                <AttributeType name= "NEXT_PUSH" dt:type= "string" / >
                <AttributeType name="RETRIES" dt:type= "i4" / >
                <AttributeType name= "INTERVAL" dt:type=i4" / >
                <AttributeType name= "SYSTEM_RESULT" dt:type= "string" / >
<ElementType name= "RESULT_ACTION" content="textOnly"
                model= "closed"
                <AttributeType name= "ACTION_OP" dt:type= "enumeration"
                    dt:values= "OR AND" / >
                    <attribute type= "RID" required= "yes" / >
                <attribute type= "SYSTEM_RESULT" required= "yes" / >
                <attribute type= "USER_RESULT" required= "no" / >
                <attribute type= "ACTION_OP" required= "no" / >
                <attribute type= "NEXT_PUSH" required= "no" / >
                <attribute type= "RETRIES" default= "0" / >
                <attribute type= "INTERVAL" defalut= "180" / >
< /ElementType>
< ! --************************************************************    -- >
< 1 -- Common attributes/elements for alert types                      -- >
< ! --************************************************************    -- >
<ElementType name= "APPLICATION_ID" contents= "textOnly"
model= "closed" / >
                <AttributeType name= "RECEIVE_DATE_TIME"
                dt:type= "dateTime" / >
                <AttributeType name= "END_DATE_TIME"
                dt:type= "datetime" / >
                <AttributeType name= "CURRENT_ATTEMPT_ID"
                dt:type= "string" / >
                <AttributeTypename= "ALERT_TIME_WINDOW" dt:type= "i4" / >
< ! --************************************************************-- >
        < ! -- Voice Alert
    < ! --************************************************************-- >
<ElementType name= "PHONE_NUMBER" content= "textOnly"
model= "closed">
                <attribute type= "PHONE_TYPE" dt:type= "string"
Required= "no" / >
<ElementType>
<ElementType name= "VOICE" content= "eltOnly" model= "closed">
        <AttributeType name= "ANS_MCH_HANDLING"
        dt:type= "enumeration" required= "no" dt:values= "LEAVE_MSG
        TERMINATE_CALL" default= "TERMINATE_CALL" / >
        <attribute type= "NAME" required= "yes" / >
        <attribute type= "AND_MCH_HANDLING" />
        <attribute type= "CURRENT_ATTEMPT_ID" required ="no" / >
        <attribute type= "RECEIVE_DATE_TIME" required ="no" / >
        <attribute type= "END_DATE_TIME" required ="no" / >
        <attribute type= "ALERT_TIME_WINDOW" required ="no" / >
        <element type= "APPLCATION_ID" minOccurs= "1" maxOccurs= "1" / >
        <element type= "PHONE_NUMBER" minOccurs= "1" maxOccurs= "1" / >
        <element type= "RESULT_ACTION" minOccurs= "0" maxOccurs= "*" / >
</ElementType>
< ! --************************************************************-- >
        < ! -- E-mail Alert                                                  -- >
< ! --************************************************************-- >
<ElementType name= "TO_ADDRESS" content= "textOnly" model= "closed" / >
<ElementType name= "FROM_ADDRESS" content= "textOnly"
                model= "closed" / >
<ElementType name= "CC_ADDRESS" content= "textOnly" model= "closed" / >
<ElementType name= "BBC_ADDRESS" content= "textOnly"
Model= "closed" / >
<ElementType name= "SUBJECT" content= "textOnly" model= "closed" / >
<ElementType name= "BODY" content= "textOnly" model= "closed">
        <AttributeType name= "TYPE" dt:type= "enumeration"
        required= "no" dt:vaules= "TEXT HTML" default= "TEXT" / >
        <attribute type= "TYPE"/ >
</ElementType>
<ElementType name= "ATTACHMENT" content= "textOnly" model= "closed" / >
<ElementType name= "E-MAIL" content= "eltOnly" model= "closed">
        <attribute type= "NAME" required= "yes"/ >
        <attribute type= "CURRENT_ATTEMPT_ID" required ="no"/ >
        <attribute type= "RECEIVE_DATE_TIME" required ="no"/ >
        <attribute type= "END_DATE_TIME" required ="n"/ >
        <attribute type= "ALERT_TIME_WINDOW" required ="no"/ >
        <element type= "APPLICATION_ID" minOccurs= "1" maxOccurs= "1"/ >
        <element type= "TO_ADDRESS" minOccurs= "1" maxOccurs= "*"/ >
        <element type= "FROM_ADDRESS" minOccurs= "1" maxOccurs= "1"/ >
        <element type= "CC_ADDRESS" minOccurs= "0" maxOccurs= "*"/ >
        <element type= "BCC_ADDRESS" minOccurs= "0" maxOccurs= "*"/ >
```

-continued

```
            <element type= "SUBJECT" minOccurs= "1" maxOccurs= "1"/ >
            <element type= "BODY" minOccurs= "1" maxOccurs= "1"/ >
            <element type= "ATTACHMENT' minOccurs= "0" maxOccurs= "*"/ >
            <element type= "RESULT_ACTION" minOccurs= "0" maxOccurs= "*"
</ElementType>
    <!--**************************************************************-->
<!-- Element describing a single Alert (with rules) PUSH ELEMENT
    -->
<!--**************************************************************-->
<ElementType name= "CURRENT_PUSH" content= "textOnly"
            model= "closed"/ >
<ElementType name= "DESCRIPTION" content= "textOnly"
            model= "closed"/ >
<ElementType name= "RESULT_POST" content= textOnly"
            model= "closed"/ >
<ElementType name= "RESPONSE_QUEUE" content= "textOnly"
            model= "closed"/ >
<ElementType name= "PUSH" content= "etlOnly" model= "closed">
        <AttributeType name= "START" dt:type= "string"/ >
        <AttributeType name= "ALERT_ID" dt:type= "string"/ >
        <AttributeType name= "ALERT_NAME" dt:type= "string"/ >
        <AttributeType name= "REQUEST_DATE_TIME" dt:type= "datetime"/ >
        <attribute type= "START" required= "yes"/ >
        <attribute type= "ALERT_ID" required= "no"/ >
        <attribute type= "ALERT_NAME" required= "no"/ >
        <attribute type= "REQUEST_DATE_TIME" required= "no"/ >
        <element type= "DESCRIPTION" minOccurs= "0" maxOccurs= "1"/ >
        <element type= "CURRENT_PUSH" minOccurs= "0" maxOccurs= "1"/ >
        <element type= "RESPONSE_QUEUE" minOccurs= "0" maxOccurs= "1"/ >
        <element type= "RESULT_POST" minOccurs= "0" maxOccurs= "1"/>
        <group order= "many" minOccurs= "1" maxOccurs= "*">
                <element type= "VOICE"/ >
                <element type= "E-MAIL"/ >
        </group>
</ElementType>
    <!--**************************************************************-->
<!-- Common attributes/elements for EBA History elements            -->
    <!--**************************************************************-->
<AttributeType name= "ATTEMPT_DATE_TIME" dt:type= "datetime"/ >
    <!--**************************************************************-->
<!-- EBA -- a single entry made by a renderer for each attempt
    -->
    <!--**************************************************************-->
<ElementType name= "EBA" content= "textOnly" model= "closed">
            <attribute type= "NAME" required= "yes"/ >
            <attribute type= "RID" required= "yes"/ >
            <attribute type= "ATTEMPT_DATE_TIME" required= "yes"/ >
</ElementType>
    <!--**************************************************************-->
<!-- Activity -- a single entry made by a renderer            -->
    <!--**************************************************************-->
<ElementType name= "ACTIVITY" content= "textOnly" model="closed">
        <AttributeType name= "ATTEMPT_ID" dt:type= "string"/ >
        <AttributeType name= "SESSION_ID" dt:type= "string"/ >
        <AttributeType name= "SYSTEM_RESULT_DESCRIPTION"
                    dt:type= "string"/ >
        <AttributeType name= "DISPOSITION" dt:type= "enumeration"
                    dt:values= "FINAL PROCESSING_NEXT RETRY"/ >
        <AttributeType name= "NEXT_ATTEMPT_NAME" dt:type= "string"/ >
    <attribute type= "ATTEMPT_ID" required= "yes"/ >
    <attribute type= "SESSION_ID" required= "no"/ >
    <attribute type= "NAME" required= "yes"/ >
    <attribute type= "SYSTEM_RESULT" required= "yes"/ >
    <attribute type= "SYSTEM_RESULT_DESCRIPTION"
                    required= "no"/ >
    <attribute type= "USER_RESULT" required= "no"/ >
    <attribute type= "ATTEMPT_DATE_TIME" required= "yes"/ >
</ElementType>
    <!--**************************************************************-->
<!-- EBA History -- a trace of an Alert over its lifetime -->
    <!--**************************************************************-->
<ElementType name= "EBA_HISTORY" content= "eltOnly" model= "closed">
        <element type= "EBA" minOccurs= "0" maxOccurs= "*"/ >
        <element type= "ACTIVITY" minOccurs= "0" maxOccurr= "*"/ >
</ElementType>
    <!--**************************************************************-->
<!-- Root element for the E-Business Alert Logic            -->
    <!--**************************************************************-->
<ElementType name= "EBA_SERVICE" content= "eltOnly" model= "closed"
```

-continued

```
        order= "seq">
            <element type= "EBA_HISTORY" minOccurs= "1" maxOccurs= "1"/ >
                <element type= "PUSH" minOccurs= "1" maxOccurs= "1"/ >
            <element type= "DATA_EXCHANGE" minOccurs= "0" maxOccurs= "1"/ >
    <ElementType>
    </Schema>
```

Figure 15:
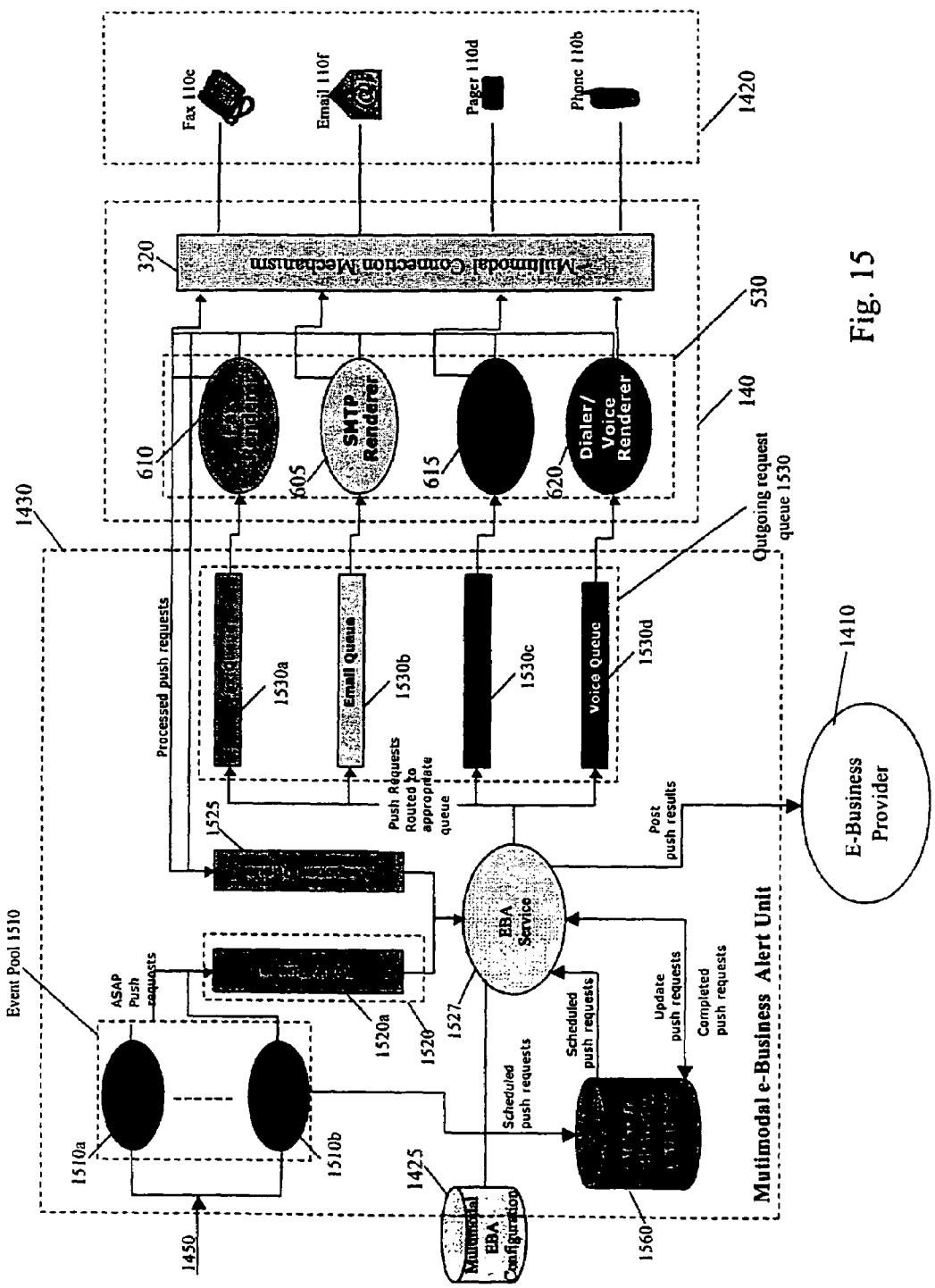
FIG. 15 depicts the internal structure of a multimodal e-business alert unit and how it interacts with a multimodal platform to provide multimodal e-business alert service according to of embodiments of the present invention.

FIG. 15 depicts in detail the high-level architecture of the multimodal e-business alert unit 1430, in relation to the various components in the multimodal platform 140. The multimodal e-business alert unit 1430 includes an event pool 1510, a set of incoming queues 1520, a response queue 1525, an EBA service 1527, a plurality of outgoing request queues 1530, and a database for storing and processing the alerts 1560. The event pool 1510 first receives alert requests or events from the e-business provider 1410. The received events 1510a, 1510b may be from different sources, each represents a push request. Based on the multimodal EBA specification encoded in each event, a push request is stored in the Alerts table of the Database and if the alert is of type "As Soon As Possible (ASAP") it is also placed into the Incoming queue 1520a. As another example, if an event specifies to send the underlying alert at a scheduled time, the alert request may be placed into and Timed Alert Table of the database 1560.

The alert request placed in incoming queues are picked up by the EBA service 1527. According to the multimodal EBA specification in each request, a multimodal outgoing request is generated by the EBA service 1527 and is pushed into an appropriate outgoing request queue 1530. For example, if the multimodal EBA specification of an alert request specifies that the alert should be sent out through facsimile, a facsimile EBA request is accordingly constructed and pushed into the outgoing facsimile queue 1530a. Similarly, for an EBA that is to be sent through e-mail, a corresponding e-mail EBA request is constructed by the EBA service 1527 and pushed to the outgoing e-mail queue 1530b. In addition an attempt record is created in the Alert_Attempt table of the database 1560 for each push attempt that is processed by the EBA.

According to the multimodal EBA configuration 1425, various renderers (610,605,615,620) in the multimodal data rendering mechanism 530 listen to the associated outgoing request queues (1530a, 1530b, 1530c, 1530d). Whenever there are requests being pushed into the outgoing request queues, the requests are picked up by the corresponding renderers and the requested EBA alerts are generated and sent to the e-business consumer 1420 through the multimodal connection mechanism 320. For example, an EBA request in the voice queue 1530d is picked up by the voice renderer 620 in the multimodal platform 140 and a voice alert is generated based on the alert content provided in the corresponding multimodal EBA specification. Once the voice alert is generated, it is sent, using a phone number provided in the corresponding multimodal EBA specification, to the phone device 110b of the e-business consumer 1420. The response from the e-business consumer 1420 with respect to the EBA alert may be obtained and sent back to the response queue 1525. The EBA service 1527 also monitors the response queue 1525 and picks up the response from a previously sent alert when it is pushed in there.

Such a response may be used to determine the next action to take. For example, if the response indicates that the alert has not been successfully reached the e-business consumer, an alternative means may be adopted to re-send the alert. In this case, the alternative means may be determined according to the instruction given in the RESULT_ACTION of the corresponding multimodal EBA specification. For example, if an alert sent to a phone (via a default means) did not go through (e.g., no one answered the phone), the next action to take may be to send the alert through e-mail (an alternative means).

When there is an alternative action defined, the EBA service 1527 constructs a different multimodal EBA request according to the multimodal EBA specification. The alternative EBA request is then push into an appropriate outgoing request queue in a similar fashion as for other EBA requests.

If the response from a previously sent alert signals that the alert has been successfully sent, the EBA service 1527 updates the Alert_Status columns of the Alert table. The alert along with the alert attempt records in the database may be communicated back to the e-business provider 1410 as an indication of fulfilling the business contract between the e-business provider 1410 and the multimodal e-business alert service 1430.

Figure 16:
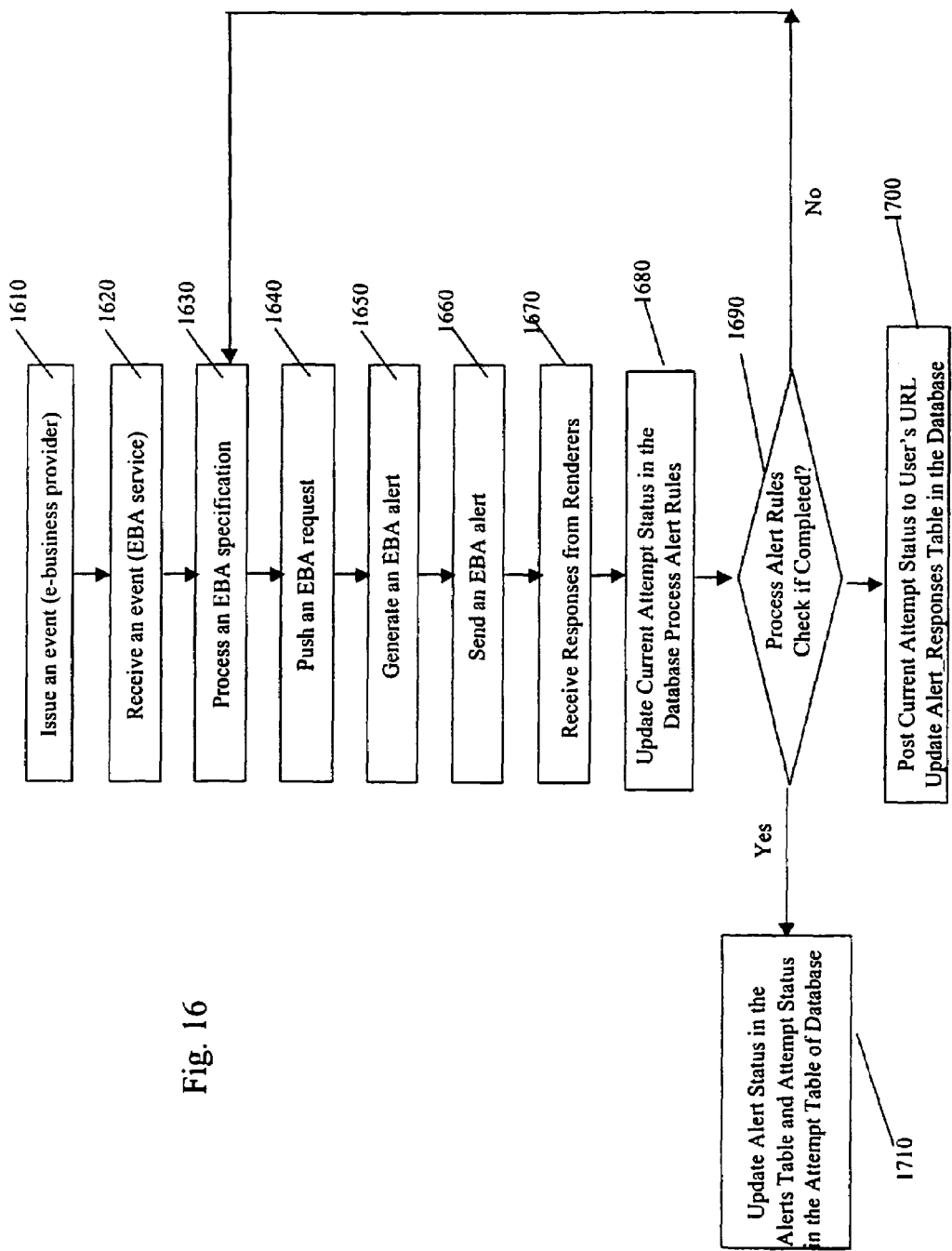
FIG. 16 is an exemplary flowchart for a multimodal e-business alert service according to of embodiments of the present invention.

FIG. 16 is an exemplary flowchart for the multimodal e-business alert service 1430. An event is initially issued, at act 1610, by the e-business provider 1410. The event serves as a service request and is sent to the multimodal e-business alert service 1430. Upon receiving the event or the alert request at act 1620, the multimodal EBA specification encoded in the alert request is processed at act 1630.

According to the EBA specification, an EBA request attempt is constructed and pushed, at act 1640, into an appropriate outgoing request queue. Such a queued EBA request is picked up by a corresponding renderer in the multimodal platform 140 that listens to the queue based on the EBA configuration. The renderer generates, at act 1650, an EBA alert according to the request. The generated EBA alert is then sent, at act 1660, to the e-business consumer 1420 through the multimodal connection mechanism 320 in the multimodal platform 140.

The responses from the renderers on the sent alert is received in act 1670. The responses consist of updated EBA history information from the renderers. The EBA updates the current attempt "status" in the alert attempt table of the database in act 1680. The EBA processes the EBA alert rules to check if the current attempt is the "final" attempt in act 1690. If the EBA alert has been successfully "Completed" i.e., all alert rules have been processed then no more attempts are created and the alert status is updated 1710. The EBA also posts the results of the current attempt to the User's URL specified in the alert 1700. The response information is used to update the alert responses table in the database. If the EBA has not completed processing all the rules then another alert attempt is created and the service returns to act 1630. If there is, the multimodal e-business alert service 1430 returns to act 1630 to process the EBA specification so that a different EBA attempt request, to be constructed based on the alternative means specified in the EBA specification, can be pushed to the outgoing queue so that the alert can be sent to the e-business consumer 1420 via a different means.

An example of an E-Business Alerts Schema is provided in Appendix 1 hereto which is considered as part of this disclosure.

Although described with reference a particular system, the present invention operates on any computer system and can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

The software of the present invention can be written in any suitable high-level computer language. In the present embodiment, the software is written in a combination of the programming languages Visual Basic, C and C++. The attached APPENDIX3 contains the source code for a particular implementation of an embodiment of this invention. Further, while aspects of the present invention have been implemented in software running on a computer system as described above, all aspects of the present invention can also be implemented in hardware.

Thus, are provided methods, devices and systems for voice-enabled access to data. One skilled in the art will appreciate that the present invention can be practiced by other than the described embodiments, which are presented for purposes of illustration and not limitation, and the present invention is limited only by the claims that follow.

```
<?xml version= "1.0"?>
<?xml :namespace name= "urn :uuid:E64325C2-837B-4fe6-A4DF-
C5F30B7F9A78/" as= "WEBVERSA_EBA"/?>
<!--***********************************************-->
<!-- XML-Data Schema for the WEbversa E-Business Alerts Service
-->
<!-- Version: 2.000 -->
<!-- Created: 12/12/2000         -->
<!--***********************************************-->
<Schema xmlns= "urn:schemas-microsoft-com:xml-data"
xmlns:dt= "urn:schemas=Microsoft-com:datatypes">
    <!--***********************************************-->
    <!-- Base datatypes for an E-Business Alert     -->
    <!--***********************************************-->
        <AttributeType name="NAME" dt:type= "string"/ >
    <!--***********************************************-->
    <!-- Base elements used in the major E-Business Alert elements -->
    <!--***********************************************-->
        <ElementType name= "VALUE" content= "textOnly"
model= "closed"/ >
    <!--***********************************************-->
    <!-- Element for DATA_EXCHANGE on Alert         -->
    <!--***********************************************-->
        <AttributType name= "SESSION" dt:type= "boolean"
default= "true"/ >
    <ElementType name= "DATA" content= "eltOnly" model= "closed">
        <attribute type= "NAME" required= "yes"/ >
        <attribute type= "SESSION" required= "no"/ >
        <element type= "VALUE" minOccurs= "1" maxOccurs "1"/ >
    </ElementType>
    <ElementType name= "DATA_EXCHANGE" content= "eltOnly" order= "seq">
            <element type= "DATA" minOccurs= "0" maxOccurs= "*"/ >
    </ElementType>
        <!--***********************************************-->
        <!-- Element for result actions on an Alert        -->
        <!--***********************************************-->
        <AttributeType name= "USER_RESULT" dt:type= "string"/ >
        <AttributeType name= "RID" dt:type= "string"/ >
        <AttributeType name= "NEXT_PUSH" dt:type= "string"/ >
        <AttributeType name= "RETRIES" dt:type= "i4"/ >
        <AttributeType name= "INTERVAL" dt:type= "i4"/ >
        <AttributeType name= "SYSTEM_RESULT" dt:type= "string"/ >
    <ElementType name= "RESULT_ACTION" content=textOnly"
            model= "closed">
        <AttributeType name= "ACTION_OP" dt:type= "enumeration"
        dt:values= "OR AND"/ >
            <attribute type= "RID" required= "yes"/ >
            <attribute type= "SYSTEM_RESULT" required= "yes"/ >
            <attribute type= "USER_RESULT" required= "no"/ >
            <attribute type= "ACTION_OP" required= "no"/ >
            <attribute type= "NEXT_PUSH" required= "no"/ >
            <attribute type= "RETRIES" default= "0"/ >
            <attribute type= "INTERVAL" default= "180"/ >
    </ElementType>
    <!--***********************************************-->
    <!-- Common attributes/elements for alert types    -->
    <!--***********************************************-->
    <ElementType name= "APPLICATION_ID" content= "textOnly"
    model= "closed"/ >
                <AttributeType name= "RECEIVE_DATE_TIME"
        dt:type "dateTime"/ >
        <AttributeType name= "END_DATE_TIME"
```

-continued

```
        dt:type= "datetime"/ >
        <AttributeType name= "CURRENT_ATTEMPT_ID"
        dt:type= "string"/ >
        <AttributeType name= "ALERT_TIME _WINDOW" dt:type= "i4"/ >
<!--*************************************************-->
            <!-- Voice Alert                          -->
<!--*************************************************-->
<ElementType name= "PHONE_NUMBER" content= "textOnly"
model= "closed">
    <AttributeType name= "PHONE_TYPE" dt:type= "string"
required= "no"/ >
    <attribute type= "PHONE_TYPE" default= "US"/ >
</ElementType>
</ElementType name= "VOICE" CONTENT= "eltOnly" model= "closed">
        <AttributeType name= "AND_MCH_HANDLING"
        dt:type= "enumeration" required= "no" dt:values= "LEAVE_MSG
        TERMINATE_CALL" default= "TERMINATE_CALL"/ >
        <attribute type= "NAME" required= "yes"/ >
        <attribute type= "AND_MCH_HANDLING"/ >
        <attribute type= "CURRENT_ATTEMPT_ID" required = "no"/ >
        <attribute type= "RECEIVE_DATE_TIME" required = "no"/ >
        <attribute type= "END_DATE_TIME" required = "no"/ >
        <attribute type= "ALERT_TIME_WINDOW" required "no"/ >
        <element type= "APPLICATION_ID" minOccurs = "1" maxOccurs= "1"/ >
        <element type= "PHONE_NUMBER" minOccurs = "1" maxOccurs= "1"/ >
        <element type= "RESULT_ACTION" minOccurs = "1" maxOccurs= "1"/ >
</ElementType>
<!--*************************************************-->
        <!-- E-mail Alert                             -->
<!--*************************************************-->
<ElementType name= "TO_ADDRESS" content= "textOnly" model= "closed"/ >
<ElementType name= "FROM_ADDRESS" content= "textOnly"
                model= "closed"/ >
<ElementType name= "CC_ADDRESS" content= "textOnly" model= "closed"/ >
<ElementType name= "BCC_ADDRESS" content= "textOnly"
model= "closed"/ >
<ElementType name= "SUBJECT" content= "textOnly" model= "closed"/ >
<ElementType name= "BODY" content="textOnly" model= "closed"/ >
        <AttributeType name= "TYPE" dt:type= "enumeration"
        Required= "no" dt:values= "TEXT HTML" default= "TEXT"/ >
        <attribute type= "TYPE"/ >
<ElementType>
<ElementType name= "ATTACHMENT" content= "textOnly" model= "closed"/ >
<ElementType name= "E-MAIL" content= "textOnly" model= "closed"/ >
        <attribute type= "NAME" required= "yes"/ >
        <attribute type= "CURRENT_ATTEMPT_ID" required = "no"/ >
        <attribute type= "RECEIVE_DATE_TIME" required = "no"/ >
        <attribute type= "END_DATE_TIME" required = "no"/ >
        <attribute type= "ALERT_TIME_WINDOW" required = "no"/ >
        <attribute type= "RECEIVE_DATE_TIME" required = "no"/ >
        <element type= "APPLICATION_ID" minOccurs = "1" maxOccurs= "1"/ >
        <element type="TO_ADDRESS" minOccurs= "1" maxOccurs= "*"/ >
        <element type= "FROM_ADDRESS" minOccurs= "1" maxOccurs= "1"/ >
        <element type= "CC_ADDRESS" minOccurs= "0" maxOccurs= "*"/ >
        <element type= "BCC_ADDRESS" minOccurs= "0" maxOccurs= "*"/ >
        <element type= "SUBJECT" minOccurs= "1" niaxOccurs= "1"/ >
        <element type= "BODY" minOccurs= "1" maxOccurs= "1"/ >
        <element type= "ATTACHMENT" minOccurs= "0" maxOccurs= "*"/ >
        <element type= "RESULT_ACTION" minOccurs= "0" maxOccurs= "*"/ >
</ElementType>
    <!--*************************************************-->
<!-- Element describing a single Alert (with rules) PUSH ELEMENT
        -- >
<!--*************************************************-->
<ElementType name= "CURRENT_PUSH"content= "textOnly"
                model= "closed"/ >
<ElementType name= "DESCRIPTION"content= "textOnly"
                model= "closed"/ >
<ElementType name= "RESULT_POST"content= "textOnly"
                model= "closed"/ >
<ElementType name= "RESPONSE_QUEUE"content= "textOnly"
                model= "closed"/ >
<ElementType name= "PUSH"content= "textOnly" model= "closed"/ >
        <AttributeType name= "START" dt:type= "string"/ >
        <AttributeType name= "ALERT_ID" dt:type= "string"/ >
        <AttributeType name= "ALERT_NAME" dt:type= "string"/ >
        <AttributeType name= "REQUEST_DATE_TIME" dt:type= "datetime"/ >
        <attribute type name= "START" required= "yes"/ >
        <attribute type name= "ALERT_ID" required= "no"/ >
```

-continued

```
        <attribute type name= "ALERT_NAME" required= "no"/ >
        <attribute type name= "REQUEST_DATE_TIME" required= "no"/ >
        <element type= "DESCRIPTION" minOccurs= "0" maxOccurs= "1"/ >
        <element type= "CURRENT_PUSH" minOccurs= "0" maxOccurs= "1"/ >
        <element type= "RESPONSE_QUEUE" minOccurs= "0" maxOccurs= "1"/ >
        <element type= "RESULT_POST" minOccurs= "0" maxOccurs= "1"/ >
        <group order= "many" minOccurs= "1" maxOccurs= "*"/ >
                <element type= "VOICE"/ >
                <element type= "E-MAIL"/ >
        </group>
<ElementType>
<! --****************************************************-- >
<! -- Common attributes/elements for EBA History elements    -- >
<! --****************************************************-- >
<AttributeType name= "ATTEMPT_DATE_TIME" dt:type= "datetime"/ >
<! --****************************************************-- >
<! --****************************************************-- >
<! -- EBA - a single entry made by a renderer for each attempt
    -- >
<! --****************************************************-- >
<ElementType name= "EBA" content="textOnly" model= "closed">
            <attribute type= "NAME" required= "yes"/ >
            <attribute type= "RID" required= "yes" / >
            <attribute type= "ATTEMPT_DATE_TIME" required= "yes"/ >
</ElementType>
<! --****************************************************-- >
<! - Activity - a single entry made by a renderer         -- >
<! --****************************************************-- >
<ElementType name= "ACTIVITY" content= "textOnly" model= "closed">
        <AttributeType name= "ATTEMPT_ID" dt:type= "string"/ >
        <AttributeType name= "SESSION_ID" dt:type= "string"/ >
        <AttributeType name= "SYSTEM_RESULT_DESCRIPTION"
                dt:type= "string"/ >
        <AttributeType name= "DISPOSITION" dt:type= "enumeration"
            dt:values= "FINAL PROCESSING_NEXT RETRY"/ >
        <AttributeType name= "NEXT_ATTEMPT_NAME" dt:type= "string"/ >
            <attribute type name= "ATTEMPT_ID" dt:type= "yes"/ >
            <attribute type name= "SESSION_ID" required= "no"/ >
            <attribute type name= "NAME" required= "yes"/ >
            <attribute type name= "SYSTEM_RESULT" required= "yes"/ >
            <attribute type name= "SYSTEM_RESULT_DESCRIPTION"
                    required= "no"/ >
            <attribute type name= "USER_RESULT" required= "no"/ >
            <AttributeType name= "ATTEMPT_DATE_TIME" required= "yes"/ >
</ElementType>
<! --****************************************************-- >
<! -- EBA History - a trace of an Alert over its lifetime    -- >
    <! --****************************************************-- >
<ElementType name= "EBA_HISTORY" content="eltOnly" model= "closed">
        <element type = "EBA"minOccurs= "0" maxOccurs= "*"/ >
        <element type = "ACTIVITY"minOccurs= "0" maxOccurs= "*"/ >
</ElementType>
<! --****************************************************-- >
<! -- Root element for the E-Business Alert Logic           -- >
<! --****************************************************-- >
<ElementType name= "EBA_SERVICE" content="eltOnly" model= "closed"
        order= "seq">
        <element type = "EBA_HISTORY"minOccurs= "1" maxOccurs= "1"/ >
        <element type = "PUSH" minOccurs= "1" maxOccurs= "1"/ >
        <element type = "DATA_EXCHANGE"minOccurs= "0" maxOccurs= "1"/ >
</ElementType>
</Schema>
```

What is claimed is:

1. A system for providing multimodal information services, comprising:

a multimodal information service application configured for providing the multimodal information services to a user; and a multimodal platform configured for facilitating the multimodal information service application to provide the multimodal information services to the user, wherein the multimodal information service application is capable of receiving, through a first network, a request sent by the user via a communication device, and obtaining the information in a source modality from an information source, via a second network, the multimodal information service application is further capable of providing the information requested by the user in a destination modality to the user via the communication device, where the destination modality is determined automatically based at least in part on the communication device.

2. The system according to claim 1, wherein the communication device includes at least one of:

a wireless phone;

a PDA;

a pager;
a facsimile device; and
an e-mail mechanism.

3. The system according to claim 1, wherein the first network and the second network include at least one of:
the Internet;
an intranet;
a wireless network; and
a public service telephony network.

4. The system according to claim 1, wherein the information source includes at least one of:
a database;
a web site; and
an application.

5. A system for a multimodal platform, comprising:
a multimodal interaction enabling mechanism capable of generating multimodal data based on data in a source modality in accordance with at least one destination modality automatically determined based in part on corresponding at least one communication device receiving the multimodal data; and
a multimodal connection mechanism capable of switching multimodal data to at least one channel appropriate for the at least on destination modality through which the multimodal data are transmitted.

6. The system according to claim 5, wherein the multimodal connection mechanism comprises:
at least one data channel for transferring data in at least one modality; and
a channel switching mechanism for routing multimodal data to at least one data channel appropriate to the multimodal data.

7. The system according to claim 5, wherein the multimodal interaction enabling mechanism comprises:
a data adapter for rendering data in the source modality into data in the at least one destination modality, the data in the source modality being obtained from an information source; and
an adapted data storage for storing data in the at least one destination modality, rendered by the data adapter.

8. The system according to claim 7, wherein the data adapter comprises:
an application interface configured for performing interaction between the multimodal platform and a multimodal information service application;
a data retrieval mechanism configured for accessing the data in the source modality from the information source; and
a multimodal data rendering mechanism configured for rendering the data in the source modality into the data in the at least one destination modality.

9. The system according to claim 8, wherein the multimodal data rendering mechanism comprises at least one of:
an electronic mail renderer for rendering the data in source modality into an electronic mail;
a facsimile renderer for rendering the data in source modality into a facsimile;
a paging renderer for rendering the data in source modality into a paging message;
a text-to-speech renderer for rendering data in text modality into data in speech modality; and
a speech-to-text renderer for rendering data in speech modality into data in text modality.

10. A system for a voice-enabled information service, comprising:
a dialog unit configured for performing a voice based dialog with an information user;
a voice clipboard configured for storing the content of the voice based dialog;
a request queue configured for storing a service request from the information user made during the voice based dialog, the service request requesting information to be delivered to the information user in a destination modality determined automatically based in part on a communication device used to receive the information;
a multimodal platform configured for accessing the service request and generating the information in the destination modality; and
a result queue configured for storing the information in the destination modality.

11. A system for multimodal e-business alert service, comprising:
a multimodal e-business alert configuration that dictates different aspects of how the multimodal e-business alert service is to behave; and
a multimodal e-business alert unit capable of generating a multimodal e-business alert based on a multimodal e-business alert specification contained in an event issued by an e-business provider and the multimodal e-business alert configuration, wherein
the multimodal e-business alert, once generated, being sent to an e-business consumer in accordance with the multimodal e-business alert specification.

12. The system according to claim 11, wherein the multimodal e-business alert unit comprises:
at least one incoming request queue configured for queuing an event from the e-business provider;
an e-business alert request issuer configured for constructing an e-business alert request based on an event and activating a multimodal platform in accordance with the e-business alert request; and
at least one outgoing request queue configured for queuing the e-business alert request, where the at least one outgoing alert queue is coupled to the multimodal platform and each outgoing request queue corresponds to a modality, an e-business alert request queued in each outgoing queue is accessed by the multimodal platform to generate an e-business alert in at least one destination modality.

13. The system according to claim 12, wherein the at least one incoming request queue comprises at least one of:
a first incoming queue for queuing an event, received from the e-business provider, that specifies that a multimodal e-business alert is to be sent to the e-business consumer as soon as possible; and
a second incoming queue for queuing an event, received from the e-business provider, that specifies that a multimodal e-business alert is to be sent to the e-business consumer at a given time.

14. The system according to claim 12, wherein the at least one outgoing request queue comprises at least one of:
a facsimile queue configured for queuing an e-business alert request for sending an e-business alert to the e-business consumer via facsimile;
an electronic mail queue configured for queuing an e-business alert for sending an e-business alert to the e-business consumer via an electronic mail;
a pager queue configured for queuing an e-business alert request for sending an e-business alert to the e-business consumer via a pager; and
a voice queue for queuing an e-business alert request for sending an e-business alert to the e-business consumer via a voice channel.

15. The system according to claim 12, further comprising:
a response queue configured for storing an outcome associated with sending an e-business alert to the e-business consumer; and
a history database for storing information related to the history of sending e-business alerts to and receiving responses from the e-business consumer.

16. A system for an e-business provider, comprising:
a detector configured for detecting a condition associated with a multimodal e-business alert specified by an e-business consumer;
an event constructor configured for constructing an event when the condition is detected, wherein the event includes an multimodal e-business alert specification comprising information relating to a multimodal e-business alert to be sent to an e-business consumer;
a transmitter configured for sending the event to a multimodal c-business alert service provider, requesting the multimodal c-business alert service provider to send the multimodal e-business alert to the e-business consumer.

17. A method for multimodal information services, comprising:
receiving a service request via a first network, the service request being sent by an information user via a communication device;
identifying an information source from where the requested information desired by the information user can be obtained;
determining a source modality of the requested information;
determining automatically at least one destination modality in which the requested information is to be delivered to the information user;
retrieving the requested information in the source modality from the information source;
rendering the requested information in the source modality into the at least one destination modality when the source modality differs from the at least one destination modality;
switching the requested information in the at least one destination modality to one or more channels appropriate for the at least one destination modality; and
sending the requested information in the at least one destination modality through the one or more channels to the information user via a second network.

18. The method according to claim 17, further comprising storing the requested information in the at least one destination modality in an adapted data storage for future access.

19. A method for voice-enabled information service, comprising:
automatically conducting a conversation with an information user through a communication device;
updating a clipboard based on the conversation;
processing the conversation to extract a request for information made by the information user during the conversation,
determining automatically a destination modality in which the information is to be sent to the information user;
rendering the information into the destination modality; and
sending the information in the destination modality to the information user.

20. A method for multimodal e-business alert service, comprising:
constructing a multimodal e-business alert configuration that dictates different aspects of how the multimodal e-business alert service is to behave;
receiving an event, generated by an e-business provider, wherein the event requesting the multimodal e-business alert service to send an e-business alert to an e-business consumer, the event including a multimodal e-business alert specification comprising information relating to how the e-business alert is to be sent to the e-business consumer;
sending a multimodal e-business alert to the e-business consumer based on the multimodal e-business alert configuration and the e-business alert specification, wherein the multimodal e-business alert being represented in at least one destination modality.

21. The method according to claim 20, wherein the multimodal c-business alert is sent via one or more channels appropriate for the at least one destination modality.

22. The method according to claim 21, wherein the at least one destination modality is determined automatically based at least in part on a type of communication device pre-specified by the c-business consumer.

23. The method according to claim 20, wherein the multimodal e-business alert specification comprises a push including information relating the multimodal e-business alert to the e-business consumer.

24. The method according to claim 23, wherein the push specifies an alternative destination modality to send the multimodal e-business alert to the e-business consumer if the sending the multimodal e-business alert in at least one destination modality is not successful.

25. A machine-readable medium having instructions stored thereon for multimodal information services, the instructions, upon being read by a machine, causing the machine to perform the following:
receiving a service request from an information user via a first network, the request being sent through a communication device;
identifying an information source from where the requested information desired by the information user can be obtained;
determining a source modality of the requested information;
determining automatically at least one destination modality in which the requested information is to be delivered to the information user;
retrieving the requested information in the source modality from the information source;
rendering the requested information in the source modality into requested information in the at least one destination modality when the source modality differs from the at least one destination modality;
switching the requested information in the at least one destination modality to one or more channels appropriate for the at least one destination modality; and
sending the requested information in the at least one destination modality through the one or more channels to the information user via a second network.

26. The medium according to claim 25, the instructions, upon being read by a machine, further causing the machine to store the information in the at least one destination modality in an adapted data storage.

27. A machine-readable medium having instructions stored thereon for voice-enabled information service, the instructions, upon being read by a machine, causing the machine to perform the following:
automatically conducting a conversation with an information user through a communication device;
updating a clipboard based on the conversation;

processing the conversation to extract a request for information made by the information user during the conversation, determining automatically at least one destination modality in which the information is to be sent to the information user;

rendering the information into the at least one destination modality; and sending the information in the at least one destination modality to the information user.

28. A machine-readable medium having instructions recorded thereon for providing multimodal e-business alert service, the instructions, when read by a machine, causing the machine to perform the following:

accessing a multimodal e-business alert configuration that dictates different aspects of how the multimodal e-business alert service is to behave;

receiving an event, generated by an e-business provider, wherein the event requesting the multimodal e-business alert service to send an e-business alert to an e-business consumer, the event including a multimodal e-business alert specification comprising information relating to how the e-business alert is to be sent to the e-business consumer;

sending a multimodal e-business alert to the e-business consumer based on the multimodal e-business alert configuration and the e-business alert specification, wherein the multimodal e-business alert being represented in at least one destination modality.

29. A machine-readable medium having instructions recorded thereon for providing multimodal e-business alert service, for requesting a multimodal e-business alert service, the instructions, when read by a machine, causing the machine to perform the following:

detecting a condition associated with a multimodal e-business alert service provided to an e-business consumer, wherein the condition is defined by the e-business consumer;

constructing an event when the condition is detected, wherein the event includes an multimodal e-business alert specification comprising information relating to a multimodal e-business alert to be sent to an e-business consumer;

sending the event to a multimodal e-business alert service provider, requesting the multimodal e-business alert service provider to send the multimodal e-business alert to the e-business consumer.

* * * * *